US012697607B2

(12) United States Patent
Hu et al.

(10) Patent No.: US 12,697,607 B2
(45) Date of Patent: Aug. 4, 2026

(54) METHODS AND COMPOSITIONS FOR PRODUCTION OF CO₂-FREE HYDROGEN AND CARBON NANOMATERIALS BY METHANE DECOMPOSITION

(71) Applicants: WEST VIRGINIA UNIVERSITY, Morgantown, WV (US); BATTELLE MEMORIAL INSTITUTE, Richland, WA (US)

(72) Inventors: Jianli Hu, Morgantown, WV (US); I-Wen Wang, Morgantown, WV (US); Lili Li, Zhoukou (CN); Robert Alexander Dagle, Richland, WA (US); Juan A. Lopez-Ruiz, Richland, WA (US); Mengze Xu, Richland, WA (US); Stephen deLemos Davidson, Richland, WA (US)

(73) Assignees: Battelle Memorial Institute, Richland, WA (US); West Virginia University, Morgantown, WV (US)

( * ) Notice: Subject to any disclaimer, the term of this patent is extended or adjusted under 35 U.S.C. 154(b) by 630 days.

(21) Appl. No.: 17/772,967

(22) PCT Filed: Oct. 30, 2020

(86) PCT No.: PCT/US2020/058419
§ 371 (c)(1),
(2) Date: Apr. 28, 2022

(87) PCT Pub. No.: WO2021/087405
PCT Pub. Date: May 6, 2021

(65) Prior Publication Data
US 2022/0339609 A1 Oct. 27, 2022

Related U.S. Application Data

(60) Provisional application No. 62/927,951, filed on Oct. 30, 2019.

(51) Int. Cl.
B01J 23/89 (2006.01)
B01J 21/18 (2006.01)
(Continued)

(52) U.S. Cl.
CPC .......... B01J 23/892 (2013.01); B01J 21/185 (2013.01); B01J 35/45 (2024.01); B01J 37/08 (2013.01);
(Continued)

(58) Field of Classification Search
CPC ........ B01J 23/75; B01J 23/755; B01J 23/892; B01J 21/185; B01J 37/08; B01J 27/20;
(Continued)

(56) References Cited

U.S. PATENT DOCUMENTS 6,995,115 B2    2/2006  Wang et al.
7,338,917 B2    3/2008  Matsuo et al.
(Continued)

FOREIGN PATENT DOCUMENTS

CN        101337655 A     1/2009
CN        103007945 A     4/2013

OTHER PUBLICATIONS

Yi Shen and Aik Chong Luab, Synthesis of Ni and Ni-Cu supported on carbon nanotubes for hydrogen and carbon production by catalytic decomposition of methane, Aug. 28, 2014, Applied Catalysis B: Environmental, 164, 61-69 (Year: 2014).*
(Continued)

*Primary Examiner* — Daniel Berns
*Assistant Examiner* — Joshua Maxwell Speer
(74) *Attorney, Agent, or Firm* — Klarquist Sparkman, LLP

(57) ABSTRACT

In one aspect, the disclosure relates to relates to CO₂-free methods of co-producing hydrogen and solid forms of carbon via methane decomposition. The methods are effi-
(Continued)

cient, self-sustaining, and environmentally sound. In a further aspect, the disclosure relates to recyclable and recoverable catalysts supported by solid forms of carbon and methods for recycling the catalysts. In some aspects, the disclosure relates to catalysts that do not require support by solid forms of carbon. This abstract is intended as a scanning tool for purposes of searching in the particular art and is not intended to be limiting of the present disclosure.

18 Claims, 30 Drawing Sheets

(51) Int. Cl.
| | |
|---|---|
| *B01J 35/45* | (2024.01) |
| *B01J 37/08* | (2006.01) |
| *C01B 3/26* | (2006.01) |
| *C01B 3/50* | (2026.01) |

(52) U.S. Cl.
CPC .................. *C01B 3/26* (2013.01); *C01B 3/50* (2013.01); *C01B 2203/1058* (2013.01); *C01B 2203/1064* (2013.01); *C01B 2203/1082* (2013.01); *C01B 2203/1241* (2013.01)

(58) Field of Classification Search
CPC . B01J 35/45; B01J 37/343; B01J 38/02; B01J 38/485; B01J 38/60; B01J 37/18; C01B 3/26; C01B 3/50; C01B 2203/1058; C01B 2203/1064; C01B 2203/1082; C01B 2203/1241; Y02E 50/30
See application file for complete search history.

(56) References Cited

U.S. PATENT DOCUMENTS

| | | | |
|---|---|---|---|
| 7,354,563 | B2 | 4/2008 | Smalley et al. |
| 7,364,712 | B2 | 4/2008 | Ohtsuka et al. |
| 8,236,271 | B2 | 8/2012 | Dupreyat-Batiot et al. |
| 9,050,583 | B2 | 6/2015 | Ozaki et al. |
| 2008/0107586 | A1* | 5/2008 | Smalley ............... B01J 37/0238 423/447.3 |
| 2009/0208391 | A1* | 8/2009 | Ma .......................... B82Y 30/00 977/845 |

OTHER PUBLICATIONS

A. Reyhani, S.Z. Mortazavi, O. Akhavan, A.Z. Moshfegh, Sh. Lahooti, Effect of Ni, Pd and Ni-Pd nano-islands on morphology and structure of multi-wall carbon nanotubes, Apr. 25, 2007, Applied Surface Science, 253, 8458-8462 (Year: 2007).*

Almiron Baca, J. et al., "Synthesis of Ni—Cu Catalysts by Impregnation to Obtain Carbon Nanofibers by Catalytic Decomposition of Methane," *Rev. Soc. Quim. Peru.*, vol. 84, No. 1, pp. 91-106 (2018).

Shen, Y. et al., "Deactivation of bimetallic nickel-copper alloy catalyst in thermocatalytic decomposition of methane," *Catal. Sci. Technol.*, vol. 8, pp. 3853-3862 (2018).

Wang, I-W. et al., "Catalytic Decomposition of Methane into Hydrogen and High-Value Carbons: Combined Experimental and DFT Computational Study," *Catal. Sci Technol.*, vol. 11, pp. 4911-4921 (2021).

International Search Report and Written Opinion of Application No. PCT/US2023/023401, mailed Sep. 8, 2023, 8 pages.

Chen et al., "Formation of bamboo-shaped carbon filaments and dependence of their morphology on catalyst composition and reaction conditions," *Carbon*, vol. 39, pp. 1467-1475, 2001.

* cited by examiner

WVUSRF 15.0kV 12.0mm x45.0k SE(M) 3/1/2019          1.00um

METHODS AND COMPOSITIONS FOR PRODUCTION OF CO₂-FREE HYDROGEN AND CARBON NANOMATERIALS BY METHANE DECOMPOSITION

CROSS-REFERENCE TO RELATED APPLICATIONS

This Application is the 35 U.S.C. § 371 national stage application of PCT Application No. PCT/US2020/058419 filed Oct. 30, 2020, where the PCT claims priority to, and the benefit of U.S. Provisional Application No. 62/927,951, filed on Oct. 30, 2019, both of which are herein incorporated by reference in their entireties.

STATEMENT AS TO RIGHTS TO DISCLOSURES MADE UNDER FEDERALLY-SPONSORED RESEARCH AND DEVELOPMENT

This invention was made with Government support under grant number DE-AC0576RL01830, awarded by the Department of Energy. The Government has certain rights in the invention.

BACKGROUND

Climate change as well as the depletion of easily-accessible sources of fossil fuels are driving interest in alternative fuels. Hydrogen is a promising and environmentally benign energy source that can be converted into transportation fuel, electricity, and other energy forms, all while producing less pollution but retaining high energy efficiency.

Currently, the most commercially viable method for hydrogen production is from natural gas using steam methane reforming, which relies upon the following reaction:

$$CH_4 + 2H_2O \rightarrow 4H_2 + CO_2$$

Although alternative sources of methane, such as food and green waste, exist, most methane used in industry is still fossil fuel-based, and steam methane reforming essentially uses one greenhouse gas (i.e., methane) to produce another greenhouse gas (i.e., carbon dioxide) in the process of forming the desired molecular hydrogen product. Furthermore, hydrogen fuel prices range from around $13 to over $16 per kilogram, translating on a price per energy basis to a cost of over $5.60 per gallon of gasoline.

Catalysts have been employed to improve the efficiency of hydrogen production by reducing the energy input required and improving product selectivity. However, in current processes, catalysts suffer deactivation over time and must eventually be replaced or regenerated. In some instances, spent catalysts have been discarded in landfills or disposed of as solid hazardous waste, practices that are neither environmentally-friendly nor economically advantageous. Noble metal catalysts, such as palladium, are especially costly and recovery may be attempted. However, recycling of commonly used alumina- or silica-supported metal catalysts is challenging and requires multiple process steps and operation of complex equipment.

Alternatives to steam methane reforming have been explored but have not yet been successful and cannot yet be scaled up to be industrially useful. Metal catalysts such as nickel, iron, and cobalt have been examined. Although nickel-catalyzed processes show some ability to produce carbon nanotubes rather than carbon dioxide as a byproduct, nickel catalysts typically immediately deactivate at temperatures above 600° C., while these and higher temperatures may be required for successful reaction completion. Iron has thus far demonstrated a shorter lifetime and lower activity level than nickel, and the success of approaches using cobalt has not yet been determined.

Despite advances in the production of hydrogen from natural gas, current methods present environmental hazards such as the production of carbon dioxide as a byproduct and the production of spent catalyst that must either be discarded as hazardous waste or processed via expensive and involved means to recycle them and/or to recover metals therefrom. Current methods of hydrogen production are further associated with high costs, making hydrogen-powered vehicles less desirable to consumers from an economic standpoint. Alternative metals explored as catalysts generally show low activity and still deactivate over time. What is needed is a more efficient process for producing hydrogen from natural gas. The process would ideally be environmentally friendly, inexpensive, and produce commercially useful products such as carbon nanotubes or carbon nanofibers rather than greenhouse gases such as carbon dioxide. The process would further enable easier catalyst recycling while maintaining performance over many catalytic cycles. These and other needs are satisfied by the present disclosure.

SUMMARY

In accordance with the purpose(s) of the present disclosure, as embodied and broadly described herein, the disclosure, in one aspect, relates to CO₂-free methods of co-producing hydrogen and solid forms of carbon via methane decomposition. The methods are efficient, self-sustaining, and environmentally benign. Moreover, the disclosed methods provide for self-sustained production without using externally added catalyst. In a further aspect, the disclosure relates to recyclable and recoverable catalysts supported by solid forms of carbon and methods for recycling the catalysts.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 10 is a comparison of catalytic performance among supported and unsupported catalysts (pressure 0.1 MPa, 0.2 g catalyst loading, flow rate=30 mL/min).

FIG. 26A shows a representative transmission electron micrographs of spent 10Ni-1Cu/CNT demonstrating that the carbon product consisting of carbon nano fiber (CNF) with the fiber diameter ranging from 10 nm to 60 nm. FIG. 26B shows a representative transmission electron micrographs of spent 10Ni-1Cu/CNT demonstrating that the carbon product consisting of carbon nano fiber (CNF) with the fiber diameter ranging from 10 nm to 60 nm.

Figure 1:
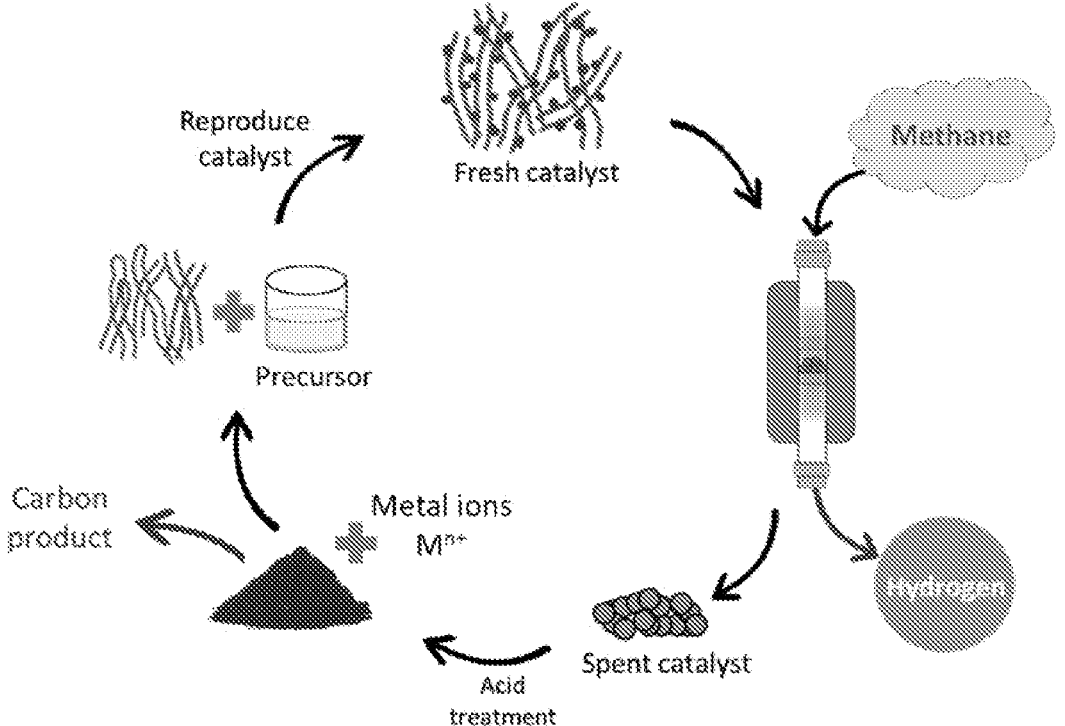
FIG. 1 shows the catalysis and catalyst-recycling process according to an example embodiment disclosed herein.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a catalyst" or "a metal" includes, but is not limited to, combinations of two or more such catalysts or metals, and the like.

"Steam methane reforming" as used herein is a process for the production of hydrogen from natural gas. In steam methane reforming, methane is heated with steam, typically in the presence of a catalyst, to produce a mixture of $CO_x$ species and hydrogen. CO and $CO_2$ produced may be reacted further in separate processes. In one aspect, the methods and processes disclosed herein are alternatives to steam methane reforming that do not produce $CO_x$ species.

A "fossil fuel" as used herein is a fuel formed by natural processes in the geological past such as, for example, coal, oil, or natural gas. In one aspect, the methane reformed by the processes disclosed herein is a fossil fuel. In an alternative aspect, methane from non-fossil fuel sources such as, for example, food waste or green waste, can also be a raw material for the processes disclosed herein.

"Carbon nanomaterials" are carbon-based materials having at least one dimension on the nanometer scale in size (i.e., from 1 to 1000 nm). Carbon nanomaterials can include, but are not limited to, nanoparticles, fullerenes, carbon filaments, single- and multi-walled carbon nanotubes (CNTs), carbon nanofibers (CNFs), and various graphene-based materials.

As used herein, "carbon filaments" include materials such as "carbon nanotubes" and "carbon nanofibers." Carbon filaments are graphite-based and typically have diameters from 0.4 to 500 nm, with lengths in the micrometer-to-millimeter scale range. Carbon nanotubes (CNT) can have single walls or can be multiwalled. CNTs have typically been prepared in the past using laser ablation, arc discharge, and/or chemical vapor deposition methods. In a further aspect, known methods for producing CNTs have drawbacks such as, for example, a requirement for high temperatures (1200-3000° C.) or a requirement to be produced in a vacuum or low pressure process. In an alternative aspect, non-catalytic decomposition of methane at temperatures of from about 1000-1100° C. is known to produce amorphous carbon rather than CNTs or other carbon filaments. In one aspect, CNFs may consist of several different forms or layers of carbon. In some aspects, CNFs have properties similar to CNTs but lower tensile strength. In one aspect, CNFs are not hollow, while CNTs are hollow. In one aspect, CNTs and CNFs are used herein as supports for catalysts used in the processes disclosed herein. In another aspect, CNTs and CNFs are also products of the processes disclosed herein. In one aspect, CNTs and/or CNFs have potential applications in sensors including those useful in biomedical applications, electronic devices, lithium-ion batteries, hydrogen storage cells, protection from electrostatic discharge, structural reinforcement in construction and building projects, thin films, increasing the tensile strength of materials, textiles, coatings and films, solar cells, and numerous other related applications.

As used herein, "amorphous carbon" is carbon lacking a crystalline structure. Amorphous carbon is free and usually reactive, although it can be stabilized. In one aspect, the methods and processes disclosed herein can be fine-tuned to favor the production of CNTs and/or CNFs over amorphous carbon. In one aspect, non-catalytic decomposition of methane at high temperatures may produce some amount of amorphous carbon.

"Turbostratic carbon" is a class of carbon materials having structure between amorphous carbon and crystalline graphite. "Pyrolytic carbon" is a sub-type of turbostratic carbon that has some disorder in its graphite-like layers. In one aspect, both turbostratic and pyrolytic carbon can be formed during methane decomposition reactions. In another aspect, the methods and processes disclosed herein can be tuned to favor the production of CNTs and/or CNFs over turbostratic and/or pyrolytic forms of carbon.

As used herein, "tip growth" refers to a mechanism for growth of CNTs where methane decomposes on the top surface of the metal catalyst, carbon diffuses downwards, and CNT precipitates, pushing the catalyst off the substrate. "Base growth," meanwhile, refers to a mechanism for growth of CNTs where CNT formation does not push the catalyst up and CNT grows out of the metal at the point farthest from the substrate. In one aspect, the CNT formed via the methods disclosed herein grow via a base growth mechanism.

"CO$_x$-free" and "CO$_2$" free refer to processes and methods that do not produce measurable amounts of carbon dioxide, carbon monoxide, or related compounds as byproducts. In one aspects, the processes and methods disclosed herein are CO$_x$-free, CO$_2$-free, or both. In a further aspect, CO$_N$-free and CO$_2$-free processes are environmentally-sound as they do not release excess greenhouse gases into the atmosphere.

As used herein, "solvothermal synthesis" is a type of synthetic method for producing chemical compounds including, but not limited to, carbon nanomaterials. Most solvothermal synthesis methods are non-aqueous but water can be used as a solvent or co-solvent in some instances. Solvothermal synthesis is typically conducted at elevated temperature and pressure (i.e., in a stainless steel autoclave). In one aspect, solvothermal synthesis enables control over size, shape distribution, and/or crystallinity of nanostructured products by changing parameters such as, for example, reaction time, solvent or solvent mixture, reaction time, presence and type of a surfactant, and the like. In another aspect, the methods and processes disclosed herein may include one or more solvothermal steps.

A "spent" or "deactivated" catalyst is a catalyst that can no longer catalyze a desired reaction. Catalysts may become spent or deactivated by a variety of means including poisoning (strong absorption of species at catalytic sites), fouling (physical deposition of material on the catalyst surface), mechanical stresses such as abrasion or crushing, and the like. A spent or deactivated catalyst can be regenerated but this is often an expensive, multistep process requiring the operation of complex equipment. Spent catalysts that cannot be or will not be regenerated typically contain heavy metals and must be discarded as hazardous waste. In one aspect, provided herein are facile methods for regenerating the catalysts used in the processes disclosed here, thereby avoiding the costly and environmentally hazardous problem of processing spent catalysts.

A "monometallic" catalyst is a catalyst that includes ions or atoms of one metal only. A "bimetallic" catalyst includes ions or atoms of two metals in any proportion relative to one another. In one aspect, the catalysts disclosed herein are monometallic or bimetallic. In another aspect, additional catalysts incorporating combinations of three, four, or more metals.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a catalyst refers to an amount that is sufficient to achieve the desired improvement in the property modulated by the formulation component, e.g. achieving the desired level of modulus. The specific level in terms of wt % in a composition required as an effective amount will depend upon a variety of factors including the amount and type of metal used as catalyst, amount and type of carbon support, number of reaction cycles, and recycling/recovery strategy for the catalyst.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

CO₂-Free Method for Methane Conversion

In one aspect, disclosed herein is a method for $CO_2$-free hydrogen production through methane conversion, the method comprising at least the following steps (see also FIG. 1):

(a) admixing a first solid carbon product and one or more catalyst precursor compounds in a solvent to produce a first mixture;

(b) heating the first mixture at a first temperature for a first time period to produce a catalyst supported on the first solid carbon product, wherein the catalyst comprises metal ions or atoms;

(c) removing the solvent from the catalyst supported on the first solid carbon product to form a second mixture;

(d) using the catalyst supported on the first solid carbon product to decompose methane into a second solid carbon product and hydrogen for a second time period;

(e) collecting the hydrogen;

(f) contacting the first solid carbon product, the second solid carbon product, and the catalyst supported on the first solid carbon product with an acid composition, wherein the acid composition causes the metal ions or atoms of the catalyst to separate from the first solid carbon product and the second solid carbon product;

(g) removing the metal ions or atoms of the catalyst from the acid composition by filtration;

(h) removing the first solid carbon product and the second solid carbon product from the acid composition; and (i) using a portion of the first solid carbon product and the second solid carbon product to restart the method from step (a).

In one aspect, the method is economically advantageous. Further in this aspect, the method can reduce net production cost of molecular hydrogen to $2 per kilogram or less with the sale of solid carbon byproducts.

Catalyst Precursors

In one aspect, in step (a), the catalyst precursor compound is a nickel-containing salt that is soluble in water or an organic solvent such as, for example, $Ni(NO_3)_2 \cdot 6H_2O$, $NiCl_2$, $NiCl_2 \cdot 6H_2O$, $NiCl_2 \cdot xH_2O$, $NiBr_2$, $NiF_2$, $NiBr_2 \cdot 3H_2O$, or a combination thereof. In another aspect, in step (a), the catalyst precursor compound includes a palladium-containing salt that is soluble in water or an organic solvent such as, for example, $Pd(NO_3)_2 \cdot 2H_2O$, $PdCl_2$, $PdSO_4$, $PdI_2$, $(CF_3CO_2)Pd$, $C_{10}H_{18}O_4Pd$, $Pd(NO_3)_2$, $Pd(NO_3)_2 \cdot 4NH_3$, $Pd(C_2H_3O_2)_2 \cdot 4NH_3 \cdot 2H_2O$, $Pd(CHO_3)_2 \cdot 4NH_3$, $Pd(NH_3)_4Cl_2 \cdot H_2O$, $(C_2H_5CO_2)_2Pd$, $Pd(NH_3)_4Cl_2 \cdot H_2O$, or a combination thereof. In still another aspect, the catalyst precursor compound includes $Mn(NO_3)_2 \cdot xH_2O$, $Mn(NO_3)_2 \cdot 4H_2O$, $MnCl_2$, $MnCl_2 \cdot 4H_2O$, $MnCl_2xH_2O$, $MnCl_2H_2O$, $Fe(NO_3)_3 \cdot 9H_2O$, $FeCl_3$, $FeCl_2$, $FeCl_3 \cdot 6H_2O$, $FeCl_2 \cdot 4H_2O$, $PtCl_2$, $PtCl_4$, $HAuCl_4 \cdot xH_2O$, $AuCl_3$, $AuCl$, $HAuCl_4 \cdot 3H_2O$, $Cu(NO_3)_2 \cdot xH_2O$, $Cu(NO_3)_2 \cdot 2.5H_2O$, $Cu(NO_3)_2 \cdot 3H_2O$, $CuCl_2$, $CuCl$, $CuCl_2 \cdot 2H_2O$, $AgNO_3$, $AgCl$, $SnCl_2$, $SnCl_2 \cdot 2H_2O$, $CoCl_2$, $CoCl_2 \cdot 6H_2O$, $CoCl_2 \cdot xH_2O$, $Co(NO_3)_2 \cdot 6H_2O$, $CoSO_4 \cdot 7H_2O$, $CoSO_4 \cdot xH_2O$, $RuCl_3$, $RuCl_3xH_2O$, or a combination thereof. In another aspect, in step (a), the catalyst precursor compound is a combination of $Ni(NO_3)_2 \cdot 6H_2O$ and $Pd(NO_3)_2 \cdot 2H_2O$. In one aspect, the catalyst precursor is soluble in water, acetone, a C2, C3, or C4 alcohol such as, for example, ethanol, propanol, isopropanol, butanol, isobutanol, sec-butanol, tert-butanol, an ether such as, for example, dimethyl ether, diethyl ether, tetrahydrofuran, or dioxane, another polar solvent, or a combination thereof. In one aspect, catalyst precursors are dissolved in desired amount of solvent until complete dissolution is achieved.

Production of Disclosed Catalysts (Supported and Unsupported)

In one aspect, the catalysts disclosed herein include metal ions and/or atoms. In another aspect, the metallic species are supported on solid carbon products such as, for example, CNTs, CNFs, carbon nanoparticles, or a combination thereof. In a further aspect, in order to start the process disclosed herein, catalysts supported on solid carbon products can be prepared as follows. In one aspect, commercially sourced solid carbon products such as, for example, single-walled or multi-walled CNTs can be used in the methods disclosed herein. In one aspect, the single- or multi-walled CNTs can have an outer diameter of from about 2 to about 600 nm, or of from about 5 to about 500 nm, or from about 10 to about 300 nm, or can have an outer diameter of about 2, 5, 10, 15, 20, 25, 30, 35, 40, 45, 50, 75, 125, 150, 175, 200, 225, 250, 300, 350, 400, 450, 500, 550, or about 600 nm, or a combination of any of the foregoing values, or a range incorporating any of the foregoing values. In one aspect, multi-walled CNTs have an outer diameter of from 20 to 30 nm. In another aspect, the single- or multi-walled CNTs can have a length from about 20 nm to about 50 μm, or from about 50 nm to about 30 μm, or can have a length of about 20, 50, 100, 150, 200, 250, 300, 350, 400, 450, 500, 550, 600, 650, 700, 750, 800, 850, 900, or 950 nm, or about 1, 2, 5, 10, 15, 20, 25, or about 30 μm, or a combination of any of the foregoing values, or a range encompassing any of the foregoing values. In one aspect, multi-walled CNTs can be stirred under reflux with a concentrated acid such as, for example, nitric acid, to prepare the CNTs for catalyst synthesis. In one aspect, the temperature can be from about 25 to about 250° C., or can be about 50 to about 180° C., or can be 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, or about 250° C., or a combination of any of the foregoing values, or a range encompassing any of the foregoing values. In another aspect stirring time can be from about 1 to about 24 hours, or can be about 6 to about 16 hours, or can be 1, 2, 3, 4, 5, 6, 7, 8, 9, 10, 11, 12, 13, 14, 15, 16, 17, 18, 19, 20, 21, 22, 23, or about 24 hours, or a combination of any of the foregoing values, or a range encompassing any of the foregoing values. In one aspect, from about 0.1 g to about 1000 g, or from about 0.1 g to about 500 g, or from about 20 to about 250 g of CNTs, or 0.1, 0.2, 0.5, 1, 2, 5, 10, 25, 50, 100, 150, 200, 250, 300, 350, 400, 450, or about 500 g of CNTs, or a combination of any of the foregoing values, or a range encompassing any of the foregoing values can be stirred under reflux with acid. In a further aspect, the CNTs can be refluxed in from about 5 to about 1000 mL, or about 10 to 500 mL, or about 20 to 250 mL, or about 5, 10, 15, 20, 25, 30, 35, 40, 45, 50, 55, 60, 65, 70, 75, 80, 85, 90, 95, 100, 125, 150, 200, 250, 300, 350, 400, 450, 500, 550, 600, 650, 700, 750, 800, 850, 900, 950, or about 1000 mL of acid, or a combination of any of the foregoing values, or a range encompassing any of the foregoing values. In a further aspect, stirring at 140° C. for 12 h is sufficient to prepare the CNTs for catalyst synthesis. In an alternative aspect, pristine CNTs can be used in the disclosed process without any acid pretreatment.

In one aspect, following CNT preparation, catalyst precursor compounds are dissolved in a solvent as described previously, and CNT are then added to the solvent containing catalyst precursor compounds. In a further aspect, following this admixture, additional mixing or stirring steps may be conducted including, but not limited to, magnetic stirring, sonication, and the like. In one aspect, stirring can be carried out for from about 1 to about 24 hours, or from about 2 to about 8 hours, or for about 1, 2, 3, 4, 5, 6, 7, 8, 9, 10, 11, 12, 13, 14, 15, 16, 17, 18, 19, 20, 21, 22, 23, or about 24 hours, or a combination of any of the foregoing values, or a range encompassing any of the foregoing values. In another aspect, sonication can be carried out for from about 10 minutes to about 3 hours, or from about 20 minutes to about 1 hour, or for about 10, 15, 20, 25, 30, 35, 40, 45, 50, 55 minutes, or about 1, 1.5, 2, 2.5, or about 3 hours, or a combination of any of the foregoing values, or a range encompassing any of the foregoing values. In one aspect, stirring is carried out for 4 h followed by sonication for 30 min. Further in this aspect, stirring and sonication of the CNT and catalyst precursors results in a heterogeneous mixture that can then be autoclaved, for example, in a stainless steel container or autoclave. In one aspect, the mixture is placed into a stainless steel autoclave, sealed, and kept in an oven. In one aspect, autoclaving can be carried out at from about 80 to about 250° C., or from about 100 to about 180° C., or at about 80, 90, 100, 110, 120, 130, 140, 150, 160, 170, 180, 190, 200, 210, 220, 230, 240, or about 250° C., or a combination of any of the foregoing values, or a range encompassing any of the foregoing values. In another aspect, autoclaving can be carried out for from about 1 to about 36 hours, or from about 6 to about 18 hours, or for about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, or about 36 hours, or a combination of any of the foregoing values, or a range encompassing any of the foregoing values. In one aspect, the mixture is autoclaved at 120° C. for 12 h. In a further aspect, the autoclave is a 100 mL Teflon-lined stainless steel autoclave. In a further aspect, when a 100 mL autoclave is used, the mixture can be autoclaved in from about 10 to about 80 mL of solvent, or from about 20 to about 70 mL of solvent, or from about 30 to about 70 mL of solvent, or about 10, 20, 30, 40, 50, 60, 70, or about 80 mL of solvent, or a combination of any of the foregoing values, or a range encompassing any of the foregoing values.

In yet another aspect, following autoclaving, the mixture can be cooled to room temperature. Further in this aspect, solid particles will precipitate and the supernatant can be decanted. In other aspects, the solvent can be allowed to evaporate in a fume hood instead of or in addition to decanting. Still further in either of these aspects, the wet solid particles can be dried slowly at room temperature and/or in an oven, e.g., for about 5 h at 80° C.

In any of the above aspects, the solid carbon product used to support the catalyst can be commercially purchased, can be synthesized in the methods disclosed herein, or can be a combination thereof.

In one aspect, as an alternative to catalysts supported by CNT or other carbon products, unsupported catalysts can be synthesized. Further in this aspect, the same metal precursors can be used as when preparing supported catalysts (i.e., $Ni(NO_3)_2 \cdot 6H_2O$ and $Pd(NO_3)_2 \cdot 2H_2O$ or other acceptable salts and/or hydrates). In one aspect, the metal precursors can be dissolved in 100 mL of solvent. Further in this aspect, a 150 mL autoclave can be used. In still other aspects, different amounts of solvent and different sizes of autoclaves can be used, depending on the amount of catalyst, support (if using), and the amount of solvent employed. In one aspect, unsupported catalysts are effective in the processes disclosed herein; however, in another aspect, supported catalysts may provide for a better conversion rate, longer reaction time, and better reuse capabilities as compared to unsupported catalysts.

In one aspect, supported and unsupported catalysts can be characterized by any known method including X-ray diffraction (XRD). Without wishing to be bound by theory, it is believed that low amounts of Pd will to homogeneously distribute in larger amounts of Ni, forming a solid solution with a face-centered cubic crystal structure. In a further aspect, this phenomenon causes Pd characteristic peaks in XRD patterns to disappear. In a further aspect, lattice spacing as determined by scanning transmission electron microscopy (STEM) for Ni—Pd alloys as disclosed herein is different from that of either pure Ni or pure Pd, confirming the XRD results.

In some aspects, CNTs alone can be used as catalysts. In a further aspect, CNTs without metals may not be as effective as catalysts with metals at methane conversion and may have a shorter use lifetime.

Ratio of Metals in Catalyst

In some aspects, different metal ratios (by weight) can be used in the supported and/or unsupported catalysts disclosed herein. In a further aspect, altering the ratio of metals (such as, for example, Ni and Pd) can alter the catalytic performance of the system. In one aspect, pure Ni can be used as catalyst. In another aspect, pure Pd can be used as catalyst. In still another aspect, a different metal can be used as catalyst. In one aspect, the ratio of Ni to Pd can be 20:1, 15:1, 10:1, 5:1, 1:1, or another ratio, or a combination of any of the foregoing values, or a range encompassing any of the foregoing values. In one aspect, the ratio of Ni to Pd is 10:1. In another aspect, the ratio of Ni to Pd is 5:1. Without wishing to be bound by theory, it is believed the metals in the solid solution of Ni and Pd have synergistic catalytic effects that are only achieved when a minimum concentration of Pd is present.

In one aspect, different catalyst metal compositions may have different average particle sizes that can be determined by examination with an electron microscope. In one aspect, for a Ni/CNT catalyst, round metal particles with an average diameter of from about 50 to about 100 nm, or about 50, 60, 70, 80, 90, or about 100 nm are observed. In another aspect, for an unsupported Ni catalyst, large agglomerates with diameters of hundreds of nm (with some upwards of 500 nm) are observed. In another aspect, for a Pd/CNT catalyst, the average metal particle size is about 5 nm. In one aspect, with increased amounts of Ni versus Pd in unsupported catalysts, more agglomeration is observed. In one aspect, the same effects may not be observed for CNT-supported catalysts. Without wishing to be bound by theory, the presence of CNT or other supports may aid in distribution of the metal catalyst particles such that agglomeration does not occur. In any of the above aspects, catalyst particles with average diameters on the order of about 50 to about 100 nm that do not agglomerate may be the most effective at enabling and/or enhancing the disclosed processes. In any of the above aspects, agglomeration may be associated with sintering behavior (i.e., coalescence into a solid mass). In one aspect, catalysts that resist sintering may be particularly effective at enabling and/or enhancing the disclosed processes.

Methane Conversion/Decomposition

In one aspect, the methane conversion or decomposition process disclosed herein is preferable to steam methane reforming since it is less endothermic than steam methane reforming. In a further aspect, methane is preferable as a starting material since it has a high H/C ratio compared to other hydrocarbons. In one aspect, methane conversion or decomposition can be carried out in a fixed-bed reactor. In still another aspect, the reactor has an inner diameter of 10 mm, an outer diameter of 12 cm, and a length of 44.5 cm. The foregoing reactor can be useful for bench scale work and evaluation, and larger reactors as usual in industrial practice can be used for scaling the disclosed reaction and methods. In a further aspect, the reactor can be heated by any practical means such as, for example, an electric tube furnace. In one aspect, reaction time for methane conversion is set to 6 hours before regeneration. In a further aspect, the method disclosed herein proceeds via the following mechanism:

$$CH_4 \leftrightarrow C_{(s)} + 2H_2$$

In one aspect, in a broad sense, methane decomposition as disclosed herein can be thought of as a kinetically-controlled process wherein the reaction pathway includes three major steps: (1) C—H bond dissociation, (2) carbon diffusion through the catalyst surface, and (3) carbon assembly to 3D structure (i.e., CNTs or CNFs). In a further aspect, formation of 2D graphite layers or 3D structures depends on reaction kinetics. In one aspect, if carbon diffusion through the catalyst surface is faster than assembly into 3D structures, the coking reaction that produces graphite becomes dominant. In another aspect, if C—H bond dissociation as well as carbon diffusion are faster than assembly into 3D structures, excessive carbon is produced which can exceed the ability of the catalyst to assemble carbon into 3D structures. In a further aspect, these two steps may be faster at higher temperature. In one aspect, reducing the reaction temperature to 600° C. can reduce the speed of these two steps, thereby allowing assembly into 3D structure to occur in a controlled manner and to produce CNT/CN F.

In one aspect, prior to use, the catalyst may need to be reduced prior to use in methane conversion. In a further aspect, catalyst reduction can be accomplished in a reactor such as those described above, by heating the catalyst to from about 200 to about 650° C., or from about 300 to about 500° C., or at about 200, 250, 300, 350, 400, 450, 500, 550, 600, or about 650° C., or a combination of any of the foregoing values, or a range encompassing any of the foregoing values. In another aspect, the catalyst can be heated for from about 1 to about 12 hours, or from about 1 to about 5 hours, or for about 1, 2, 3, 4, 5, 6, 7, 8, 9, 10, 11, or about 12 hours, or a combination of any of the foregoing values, or a range encompassing any of the foregoing values. In one aspect, the catalyst is heated at 400° C. in an atmosphere containing a portion of hydrogen gas in $N_2$ for at least 4 h. In one aspect, the atmosphere can be from about 1 to about 100% $H_2$, or is about 5 to about 30% $H_2$, or is 1, 5, 10, 15, 20, 25, 30, 35, 40, 45, 50, 55, 60, 65, 70, 75, 80, 85, 90, 95, or about 100% $H_2$, or a combination of any of the foregoing values, or a range encompassing any of the foregoing values. In one aspect, the atmosphere is 10% $H_2$ and the remainder is $N_2$.

In a further aspect, after catalyst reduction, gas flow rate for methane conversion can be from about 10 to about 250 mL/min, or about 10 to about 180 mL/min, or about 20-120 mL/min, or can be about 10, 20, 30, 40, 50, 60, 70, 80, 90, 100, 110, 120, 130, 140, 150, 160, 170, 180, 190, 200, 210, 220, 230, 240, or about 250 mL/min, or a combination of any of the foregoing values, or a range encompassing any of the foregoing values. In one aspect, a gas flow rate of about 30 mL/min using 30% methane in nitrogen was used for the methane conversion step. In a further aspect, 0.2 g of catalyst is sufficient for the duration of the reaction time. In one aspect, the reaction time is from about 1 hour to about 100 hours, or is about 1, 5, 10, 15, 20, 25, 30, 35, 40, 45, 50, 55, 60, 65, 70, 76, 80, 85, 90, 95, or about 100 hours, or a combination of any of the foregoing values, or a range encompassing any of the foregoing values. In one aspect, the reaction time is about 6 hours. In one aspect, catalysis can be performed at from about 400 to about 900° C., or from about 400 to about 800° C., or from about 500 to about 700° C., or at about 400, 450, 500, 550, 600, 650, 700, 750, 800, 850, or about 900° C., or a combination of any of the foregoing values, or a range encompassing any of the foregoing values. In another aspect, the heating rate can be from about 1 to about 30° C./min, or from about 5 to about 20° C./min, or can be from about 8 to about 15° C./min, or is about 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30° C./min, or a combination of any of the foregoing values, or a range encompassing any of the foregoing values. In another aspect, catalysis is typically performed at 600° C. with a heating rate of about 10° C./min. Further in this aspect, hydrogen gas can be collected as it exits the reactor by any method known in the art.

In one aspect, the catalyst can be monometallic (i.e., Ni/CNT). In another aspect, the catalyst is bimetallic (Ni—Pd/CNT). In either of these aspects, the metal loading on the catalyst is present in an amount of from about 1 to about 100 wt %, or from about 5 to about 70 wt %, or from about 5 to about 60 wt %, or from about 10 to about 11 wt %, or is about 1, 5, 10, 15, 20, 25, 30, 35, 40, 45, 50, 55, 60, 65, 70, 75, 80, 85, 90, 95, or about 100 wt % of the total catalyst/CNT mixture, or a combination of any of the foregoing values, or a range encompassing any of the foregoing values. In one aspect, when metal loading on the catalyst is about 100%, no CNTs are present and the catalyst is thus unsupported. Further in this aspect, as disclosed herein, unsupported catalysts are functional in the processes disclosed herein. In one aspect, when a bimetallic catalyst is used, nickel weight can be from about 1 to about 89% of catalyst composition, or can be from about 2 to about 69% of catalyst composition, or can be from about 5 to about 60% of the catalyst composition, or can be about 1, 2, 5, 10, 15, 20, 25, 30, 35, 40, 45, 50, 55, 60, 65, 69, 70, 75, 80, 85, or about 89% of the catalyst composition, or a combination of any of the foregoing values, or a range encompassing any of the foregoing values. In a further aspect, when a bimetallic catalyst is used, approximately 10 wt % of the total catalyst/CNT mixture can be nickel and approximately 1 wt % of the total catalyst/CNT mixture can be palladium, with the remainder made up of CNT.

In another aspect, the metal/CNT catalysts disclosed herein retain their activity after multiple reaction and regeneration cycles. In one aspect, the catalysts retain the same level of catalytic efficiency on cycles 2, 3, 4, and 5, and beyond that they possess at cycle 1.

In one aspect, effectiveness of a catalyst can be characterized by methane conversion rate. In a further aspect, methane conversion can be from about 20% to about 60%, or can be about 20, 25, 30, 35, 40, 56, 50, 55, or about 60%, or a combination of any of the foregoing values, or a range encompassing any of the foregoing values. In one aspect, methane conversion rate can vary according to various aspects including temperature, reaction time, and catalyst composition. In a further aspect, the catalyst can be chosen to support maximization of conversion rate. In another aspect, catalyst can be selected to support maximization of time on stream or another property. In one aspect, a Pd/CNT catalyst is stable for at least 6 hours' worth of reaction time but exhibits a poor methane conversion rate of around 21%. In another aspect, a mixed Ni—Pd/CNT catalyst can increase conversion rate to from about 38 to about 45% for at least 4 hours' worth of reaction time. In one aspect, a catalyst with equal amounts of Ni and Pd can have an initial conversion rate of around 38% but this may decrease as the reaction continues. In one aspect, a mixed Ni—Pd unsupported catalyst can have a conversion rate of from about 5% to about 56%. In one aspect, unsupported 10 Ni-1 Pd has a conversion rate of about 56%, while 10 Ni-1 Pd/CNT has a conversion rate of around 43%. However, in any of the above aspects, conversion rate is not the sole determinant of catalyst choice, since carbon product such as CNT and/or CNF also must be selected for.

In any of the above aspects, catalytic efficiency can be monitored by gas chromatography by diverting all or a portion of the gas stream exiting the reactor into a suitable instrument.

Effect of Temperature

In one aspect, the methane conversion reaction disclosed herein is conducted at a temperature range of from about 500 to about 600° C., or at about 500, 510, 520, 530, 540, 550, 560, 570, 580, 590, or about 600° C., or a combination of any of the foregoing values, or a range encompassing any of the foregoing values. In another aspect, the temperature of the methane conversion reaction disclosed herein can be increased to a higher temperature, such as, for example, 650° C. In a further aspect, increasing the temperature can result in an efficient methane conversion rate; however, further in this aspect, at a higher temperature, the catalyst can become deactivated quickly. In one aspect, at 650° C., the catalyst can become deactivated in about an hour. Without wishing to be bound by theory, in this situation, when the catalyst becomes deactivated, active sites on the metal may be covered with carbon that does not continue to grow as CNT or CNF. In another aspect, if a reaction temperature has been raised to 650° C. or higher and the catalyst becomes deactivated, if the temperature is reduced to 600° C. or lower, the reaction will resume. In one aspect, this temperature cycling can be repeated and the reaction will resume each time temperature is reduced to the operable range of 500 to 600° C.

Catalyst Reproduction/Recycling

Commercially-available catalysts, especially those that are oxide-supported, are difficult to recover when dissolved in organic or inorganic solution. In one aspect, provided herein is a method for recycling and recovering the catalysts disclosed herein. In one aspect, although the catalysts disclosed herein exhibit excellent reproducibility in terms of hydrogen generation over time, they will eventually become spent or deactivated and will need to be regenerated or recycled. In another aspect, the method disclosed herein can be useful in regenerating or recycling the catalysts disclosed herein. In one aspect, spent catalysts can be refluxed with an acid such as, for example, nitric acid. In a further aspect, reflux can be carried out in one step or may require two steps, each with a different concentration of acid. In one aspect, the spent catalyst can be refluxed with nitric acid at a concentration of from 0.01 M to 15.7 M, or from about 0.5 M to 10 M, or from 0.5 M to 5 M, or the nitric acid concentration can be about 0.01, 0.05, 0.1, 0.5, 1, 1.5, 2, 2.5, 3, 3.5, 4, 4.5, 5, 5.5, 6, 6.6, 7, 7.5, 8, 8.5, 9, 9.5, 10, 10.5, 11, 11.5, 12, 12.5, 13, 13.5, 14, 14.5, 15, 15.5, or about 15.7 M, or a combination of any of the foregoing values, or a range encompassing any of the foregoing values. In another aspect, the spent catalyst can be refluxed at from about 25° C. to about 250° C., or from about 30° C. to about 140° C., or from about 40° C. to about 120° C., or can be refluxed at about 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, or about 250° C., or a combination of any of the foregoing values, or a range encompassing any of the foregoing values. In still another aspect, reflux can be conducted for from about 0.5 to about 36 hours, or from about 0.5 to about 24 hours, or from about 1 to about 18 hours, or for about 0.5, 1, 1.5, 2, 2.5, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, or about 36 hours, or a combination of any of the foregoing values, or a range encompassing any of the foregoing values. In one aspect, the spent catalyst can be refluxed with 3M $HNO_3$ at 120° C. for 4 h, followed by reflux with concentrated $HNO_3$ at 140° C. for 12 h. In some aspects, dilute nitric acid can be used for either of these reflux steps. In one aspect, the nitric acid can have a concentration of from about 0.1 M to about 15.8 M, or is about 0.1, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, or about 15.8 M or a combination of any of the foregoing values, or a range encompassing any of the foregoing values. In one aspect, reflux is conducted with continuous magnetic stirring.

In another aspect, following reflux, solid carbon particles and nanostructures can be filtered and washed with a solvent such as, for example, deionized water. In one aspect, when the metals are dissolved in acid solutions, they re-form metal counter-ion precursors, wherein the counter-ions are sourced from the acids. Thus, further in this aspect, the following scheme for nickel in nitric acid is generalizable to other metals and acids with stoichiometries determined based on metal oxidation state and counter-ion charge:

$$Ni + 4HNO_3 \rightarrow Ni(NO_3)_2 + 2NO_2 + 2H_2O$$

In one aspect, the carbon particles can be dried at elevated temperature such as, for example, at 80° C. Following drying, in another aspect, a portion of the carbon particles can be used in the next catalytic cycle. In one aspect, from about 1 to about 99 wt % of the carbon particles can be used in the next catalytic cycle, or from about 5 to about 90 wt % of the carbon particles can be used in the next catalytic cycle, or from about 10 to about 50% of the carbon particles can be used in the next catalytic cycle, or about 1, 5, 10, 15, 20, 25, 30, 35, 40, 45, 50, 55, 60, 65, 70, 75, 80, 85, 90, 95, or about 99 wt % of the carbon particles can be used in the next catalytic cycle, or a combination of any of the foregoing values, or a range encompassing any of the foregoing values.

In some aspects, Raman spectroscopy can be used to evaluate the compositions disclosed herein after 1, 2, 3 4, 5, or more cycles of use. In some aspects, the "ID/IG" ratio can be used as a basis for estimating amount of structured versus unstructured carbon in a sample. In one aspect, the D band is reflective of disordered structure and is located between about 1300 and about 1400 $cm^{-1}$ and the G band is reflective of content of $sp^2$ hybridized carbon (i.e., ordered) and is located between about 1500 and about 1600 $cm^{-1}$, although these values can vary slightly based on particular aspects of the samples being analyzed. ID/IG ratio is most helpful when comparing similar samples such as, for example, catalyst/CNT compositions after one or more use cycles as disclosed herein. A relatively higher ID/IG ratio (i.e., comparison of relative peak areas) indicates a larger proportion of disordered carbon is present in a sample, while a relatively lower ID/IG ratio indicates a larger proportion of structured or $sp^2$ hybridized carbon is present. An unchanged ID/IG between different treatments indicates the proportions of structured and unstructured carbon are essentially unchanged between treatments.

Carbon Product

In one aspect, during the catalyst reproduction or recycling step described herein, a portion of the solid carbon from the reaction vessel is retained as a support for the next catalytic cycle. Further in this aspect, since nanostructured carbon is a product of the reactions disclosed herein, some amount of excess carbon will be available after catalyst recycling. Still further in this aspect, this excess carbon is already purified and dried due to processing in the catalyst recovery step and can be further characterized by any means known in the art including, but not limited to, electron microscopy to evaluate structure, width, and length, X-ray diffraction and/or Raman spectroscopy to assess crystallinity, thermogravimetric analysis to assess whether any amorphous carbon is present, and similar techniques.

In some aspects, the CNT and CNF that are produced are single-walled. In other aspects, multiwalled carbon nanotubes (MWCNT) may be produced. In one aspect, MWCNT have a diameter close to the particle size of Ni on CNT support. Without wishing to be bound by theory, a Ni/CNT catalyst may be particularly effective at forming MWCNT.

Carbon Nanomaterial Growth Mechanism

In one aspect, the second carbon product of the method disclosed herein is deposited on the first carbon product as an extension of the nanotube or nanofibril structure. In some aspects, carbon formed on the surface of CNT-supported catalyst can diffuse to the opposite side of the carbon support. In one aspect, without wishing to be bound by theory, carbon diffusion may be due to the temperature gradient created in the carbon support due to the exothermic decomposition of methane on the surface and the endothermic deposition of carbon on the surface opposite the catalytic site. In another aspect, also without wishing to be bound by theory, due to the lower surface energy of the basal planes of graphite compared to prismatic planes, carbon filaments tend to precipitate with the basal planes into a tubular structure.

Influence of Catalyst Particle Size on Carbon Product Selectivity

In one aspect, catalyst particle size can affect the products produced by the processes disclosed herein. In a further aspect, catalyst particle size can be altered by varying support material, method of synthesis, reduction temperature, or a combination thereof. In one aspect, support material can be $Al_2O_3$ (e.g., $\gamma$-$Al_2O_3$ or another form), $MgAl_2O_4$, or a combination thereof. In another aspect, particles can be synthesized by an incipient wetness method, a sol gel method, or another known method. In still another aspect, reduction temperature can be from about 600° C. to about 850° C., or can be about 600, 625, 650, 675, 700, 725, 750, 775, 800, 825, or about 850° C. or a combination of any of the foregoing values, or a range encompassing any of the foregoing values. In another aspect, depending on the support material, metal loading can vary. In some aspects, metal loading is from about 8.5 to about 10.5 wt %, or is about 8.5, 9, 9.5, 10, or about 10.5 wt %, or is about 8.6, 9.8, or about 10.1 wt %, or a combination of any of the foregoing values, or a range encompassing any of the foregoing values. In still another aspect, the catalyst can have a surface area in $m^2/g$ of from about 90 to about 300, or of about 90, 100, 110, 120, 130, 140, 150, 160, 170, 180, 190, 200, 210, 220, 230, 240, 250, 260, 270, 280, 290, or about 300 $m^2/g$, or a combination of any of the foregoing values, or a range encompassing any of the foregoing values. In another aspect, the surface area can be 90, 96, 107, 116, or 278 $m^2/g$. In one aspect, $H_2$ uptake as evaluated by $H_2$ pulse chemisorption can range from about 4 to about 30 μmol/g, or can be about 4, 5, 6, 7, 8, 9, 10, 11, 12, 13, 14, 15, 16, 17, 18, 19, 20, 21, 22, 23, 24, 25, 26, 27, 28, 29, or about 30 μmol/g, or a combination of any of the foregoing values or a range encompassing any of the foregoing values. In one aspect, $H_2$ uptake is 4.27, 6.76, 8.06, 19.82, or 26.41 μmol/g. In still another aspect, metal particle size (where $M^{(0)}$ can be any of the metals disclosed herein, including, for example, nickel) can be determined by a variety of techniques. In one aspect, $M^{(0)}$ particle size as determined by $H_2$ chemisorption can be from about 10 to about 200 nm, or can be about 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, or about 200 nm, or a combination of any of the foregoing values or a range encompassing any of the foregoing values. In one aspect, the $M^{(0)}$ particle size as determined by $H_2$ chemisorption is about 31, 42, 103, 122, or 194 nm. In one aspect, $M^{(0)}$ particle size as determined by XRD can be from about 10 to about 25 nm, or can be about 10, 11, 12, 13, 14, 15, 16, 17, 18, 19, 20, 21, 22, 23, 24, or about 25 nm, or a combination of any of the foregoing values, or a range encompassing any of the foregoing values. In one aspect, the $M^{(0)}$ particle size as determined by XRD can be about 11.0, 11.9, 18.7, or about 23.1 nm. In another aspect, XRD can be used to confirm the identity of the support phase.

In one aspect, catalyst formulations disclosed herein have similar deactivation rates regardless of particle size. In another aspect, particle size is correlated to methane conversion rate in the processes disclosed herein. In still another aspect, larger particle sizes may be correlated with higher methane conversion rates. In still another aspect, catalyst particle size may be correlated with the formation of particular forms of carbon. In one aspect, smaller particle sizes may result in the formation of graphitic carbon layers. In another aspect, larger particle sizes may result in the formation of CNTs. In still another aspect, CNTs can continue to grow as the methane conversion progresses, thus resulting in higher levels of solid carbon product per mole of catalyst. In one aspect, when graphitic carbon layers form, they can encapsulate the catalytic active sites and prevent further methane conversion.

Advantages of the Disclosed Method

In one aspect, the method disclosed herein possesses many advantages when compared to current processes for extracting hydrogen from hydrocarbons. In a further aspect, because the method disclosed herein allows for recovery and regeneration of catalyst metal atoms, external catalyst does not need to be added, even after multiple catalytic cycles. Further in this aspect, disposal of spent catalyst is no longer necessary. In another aspect, the method, in decomposing methane into hydrogen and solid carbon, removes a greenhouse gas from the atmosphere while producing two commercially valuable products (i.e., molecular hydrogen and nanostructured carbon). In another aspect, the method produces no CO or $CO_2$. In one aspect, since the particles on which the catalyst atoms are supported are nanometer-sized, reduced temperatures can be used for methane decomposition. In any of these aspects, the method disclosed herein is economically advantageous while also being environmentally-conscious.

Aspects

The following listing of exemplary aspects supports and is supported by the disclosure provided herein.

Aspect 1. A method for producing hydrogen from methane, the method comprising: (a) admixing one or more catalyst precursor compounds in a solvent to produce a metal-precursor solution; (b) removing the solvent from the catalyst precursor compounds to form a catalyst; (c) using the catalyst to decompose methane into a product carbon and hydrogen at a reaction temperature for a reaction time period; (d) collecting the hydrogen; (e) contacting the product carbon and the catalyst with an acid composition, wherein the acid composition causes metal atoms from the catalyst precursor compounds to separate from the product carbon; (f) removing the metal atoms from the acid composition; and (g) removing the product carbon from the acid composition.

Aspect 2. The method of Aspect 1, wherein the metal-precursor solution further comprises a seed carbon support; and wherein the acid composition in step (e) causes the catalyst precursor compounds to separate from the seed carbon support Aspect 3. The method of Aspect 2, wherein step (g) further comprises removing the seed carbon support from the acid composition.

Aspect 4. The method of Aspect 2, wherein the seed carbon support is treated with an acid composition prior to step (a).

Aspect 5. The method of Aspect 2, wherein the seed carbon support is used in step (a) without pretreatment.

Aspect 6. The method of Aspect 2, wherein the metal-precursor solution is heated at a synthesis temperature for a synthesis time period to produce a catalyst supported on the seed carbon support.

Aspect 7. The method of Aspect 2, further comprising step (h) comprising using a portion of the product carbon to restart the method beginning at step (a).

Aspect 8. The method of Aspect 7, wherein from about 5 wt % to about 95 wt % of the product carbon are used to restart the method at step (a).

Aspect 9. The method of Aspect 7, wherein from about 5 wt % to about 90 wt % of the product carbon are used to restart the method at step (a).

Aspect 10. The method of Aspect 7, wherein from about 5 wt % to about 85 wt % of the product carbon are used to restart the method at step (a).

Aspect 11. The method of Aspect 7, wherein from about 5 wt % to about 80 wt % of the product carbon are used to restart the method at step (a).

Aspect 12. The method of Aspect 7, wherein from about 10 wt % to about 75 wt % of the product carbon are used to restart the method at step (a).

Aspect 13. The method of Aspect 7, wherein from about 10 wt % to about 70 wt % of the product carbon are used to restart the method at step (a).

Aspect 14. The method of Aspect 7, wherein from about 10 wt % to about 65 wt % of the product carbon are used to restart the method at step (a).

Aspect 15. The method of Aspect 7, wherein from about 10 wt % to about 60 wt % of the product carbon are used to restart the method at step (a).

Aspect 16. The method of Aspect 7, wherein from about 10 wt % to about 55 wt % of the product carbon are used to restart the method at step (a).

Aspect 17. The method of Aspect 7, wherein from about 10 wt % to about 50 wt % of the product carbon are used to restart the method at step (a).

Aspect 18. The method of Aspect 7, wherein from about 50 wt % to about 95 wt % of the product carbon are used to restart the method at step (a).

Aspect 19. The method of Aspect 7, wherein from about 50 wt % to about 90 wt % of the product carbon are used to restart the method at step (a).

Aspect 20. The method of Aspect 7, wherein from about 50 wt % to about 85 wt % of the product carbon are used to restart the method at step (a).

Aspect 21. The method of Aspect 7, wherein from about 50 wt % to about 80 wt % of the product carbon are used to restart the method at step (a).

Aspect 22. The method of Aspect 7, wherein from about 50 wt % to about 75 wt % of the product carbon are used to restart the method at step (a).

Aspect 23. The method of Aspect 7, wherein from about 50 wt % to about 70 wt % of the product carbon are used to restart the method at step (a).

Aspect 24. The method of Aspect 7, wherein from about 50 wt % to about 65 wt % of the product carbon are used to restart the method at step (a).

Aspect 25. The method of Aspect 7, wherein from about 50 wt % to about 60 wt % of the product carbon are used to restart the method at step (a).

Aspect 26. The method of Aspect 7, wherein from about 50 wt % to about 55 wt % of the product carbon are used to restart the method at step (a).

Aspect 27. The method of Aspect 2, wherein the seed carbon support comprises nanoparticles, fullerenes, carbon filaments, single-walled carbon nanotubes, multi-walled carbon nanotubes, carbon nanofibers, or a combination thereof.

Aspect 28. The method of Aspect 27, wherein the seed carbon support comprises single-walled carbon nanotubes or multi-walled carbon nanotubes.

Aspect 29. The method of Aspect 27, wherein the single-walled carbon nanotubes or multi-walled carbon nanotubes have an outer diameter of from about 5 nm to about 500 nm.

Aspect 30. The method of Aspect 29, wherein the single-walled carbon nanotubes or multi-walled carbon nanotubes have an outer diameter of from about 10 nm to about 300 nm.

Aspect 31. The method of Aspect 27, wherein the single-walled carbon nanotubes or multi-walled carbon nanotubes have a length of from about 20 nm to about 50 μm.

Aspect 32. The method of Aspect 31, wherein the single-walled carbon nanotubes or multi-walled carbon nanotubes have a length of from about 50 nm to about 25 μm.

Aspect 33. The method of Aspect 1 or Aspect 2, wherein the product carbon comprises nanoparticles, fullerenes, carbon filaments, single-walled carbon nanotubes, multi-walled carbon nanotubes, carbon nanofibers, or a combination thereof.

Aspect 34. The method of Aspect 33, wherein the product carbon comprises single-walled carbon nanotubes or multi-walled carbon nanotubes.

Aspect 35. The method of Aspect 34, wherein the single-walled carbon nanotubes or multi-walled carbon nanotubes have an outer diameter of from about 5 nm to about 500 nm.

Aspect 36. The method of Aspect 35 wherein the single-walled carbon nanotubes or multi-walled carbon nanotubes have an outer diameter of from about 10 nm to about 300 nm.

Aspect 37. The method of Aspect 33, wherein the single-walled carbon nanotubes or multi-walled carbon nanotubes have a length of from about 20 nm to about 50 μm.

Aspect 38. The method of Aspect 37, wherein the single-walled carbon nanotubes or multi-walled carbon nanotubes have a length of from about 50 nm to about 25 μm.

Aspect 39. The method of Aspect 1 or Aspect 2, wherein in step (a), the catalyst precursor compound is soluble in the solvent.

Aspect 40. The method of Aspect 39, wherein the solvent is water, a C3-C6 ketone, a C2-C4 alcohol, a C1-C6 carboxylic acid, an ether, or a combination thereof.

Aspect 41. The method of Aspect 40, wherein the solvent is acetone.

Aspect 42. The method of Aspect 1 or Aspect 2, wherein the catalyst precursor compound comprises a nickel salt, a cobalt salt, an iron salt, a palladium salt, a gold salt, a copper salt, a silver salt, a tin salt, a ruthenium salt, a rhodium salt, or combinations thereof.

Aspect 43. The method of Aspect 42, wherein the copper salt comprises $CuSO_4$, $CuCl_2$, $Cu(NO_3)_2$, $Cu(NO_3)_2 \cdot 3H_2O$, $CuO$, $Cu(CH_3COO)_2$, $Cu_3(PO_4)_2$, $Cu(ClO_4)_2$, $CuO_2$, $Cu(hfac)_2$, $CuO_3Si$, $Cu(CO_2CH_3)$, $Cu(NH_3)_4$, $Cu(SCN)_2$, $Cu(NH_3)_4SO_4 \cdot H_2O$, $Cu(OH)_2$, $CuBr_2$, or a combination thereof.

Aspect 44. The method of Aspect 42, wherein the nickel salt comprises $Ni(NO_3)_2 \cdot 6H_2O$, $NiCl_2$, $NiCl_2 \cdot 6H_2O$, $NiBr_2$, $NiF_2$, $NiBr_2 \cdot xH_2O$, $NiBr_2 \cdot 3H_2O$, or a combination thereof.

Aspect 45. The method of Aspect 42, wherein the nickel salt comprises $Ni(NO_3)_2 \cdot 6H_2O$.

Aspect 46. The method of Aspect 42, wherein the palladium salt comprises $Pd(NO_3)_2 \cdot 2H_2O$, $PdCl_2$, $PdSO_4$, $PdI_2$, $(CF_3CO_2)Pd$, $C_{10}H_{15}O_4Pd$, $Pd(NO_3)_2$, $Pd(NO_3)_2 \cdot 4NH_3$, $Pd(C_2H_3O_2)_2 \cdot 4NH_3 \cdot 2H_2O$, $Pd(CHO_3)_2 \cdot 4NH_3$, $Pd(NH_3)_4Cl_2 \cdot H_2O$, $(C_2H_5CO_2)_2Pd$, $Pd(NH_3)_4Cl_2 \cdot H_2O$, or a combination thereof.

Aspect 47. The method of Aspect 42, wherein the palladium salt comprises $Pd(NO_3)_2 \cdot 2H_2O$.

Aspect 48. The method of Aspect 42, wherein the catalyst precursor compound comprises $Ni(NO_3)_2 \cdot 6H_2O$ and $Pd(NO_3)_2 \cdot 2H_2O$.

Aspect 49. The method of Aspect 42, wherein the catalyst precursor compound comprises $Ni(NO_3)_2 \cdot 6H_2O$ and $Cu(NO_3)_2 \cdot 6H_2O$.

Aspect 50. The method of Aspect 1 or Aspect 2, wherein removing the solvent in step (b) results in the formation of a catalyst.

Aspect 51. The method of Aspect 50, wherein the catalyst is monometallic or bimetallic.

Aspect 52. The method of Aspect 50, wherein the catalyst is monometallic.

Aspect 53. The method of Aspect 52, wherein the catalyst comprises nickel ions or atoms.

Aspect 54. The method of Aspect 50, wherein the catalyst is bimetallic.

Aspect 55. The method of Aspect 54, wherein the catalyst comprises nickel ions or atoms and palladium ions or atoms.

Aspect 56. The method of Aspect 55, wherein the ratio of nickel to palladium in the catalyst is 30:1, 25:1, 20:1, 15:1, 10:1, 5:1, or 1:1.

Aspect 57. The method of Aspect 56, wherein the ratio of nickel to palladium in the catalyst is 10:1.

Aspect 58. The method of Aspect 54, wherein the catalyst comprises nickel ions or atoms and copper ions or atoms.

Aspect 59. The method of Aspect 58, wherein the ratio of nickel to copper in the catalyst is 30:1, 25:1, 20:1, 15:1, 10:1, 5:1, or 1:1.

Aspect 60. The method of Aspect 59, wherein the ratio of nickel to copper in the catalyst is 10:1.

Aspect 61. The method of any of Aspects Aspect 51 to Aspect 57, wherein the catalyst comprises an average particle diameter of greater than about 10 nm.

Aspect 62. The method of Aspect 50, wherein the seed carbon support comprises from 0 to about 90 wt % of the catalyst.

Aspect 63. The method of Aspect 50, wherein the product carbon comprises 89 wt % of the catalyst, nickel ions or atoms comprise 10 wt % of the catalyst, and palladium ions or atoms comprise 1 wt % of the catalyst.

Aspect 64. The method of Aspect 50, wherein the product carbon comprises 89 wt % of the catalyst, nickel ions or atoms comprise 10 wt % of the catalyst, and copper ions or atoms comprise 1 wt % of the catalyst.

Aspect 65. The method of Aspect 6, wherein the synthesis temperature is from about 25 to about 250° C.

Aspect 66. The method of Aspect 6, wherein the synthesis temperature is from about 30 to about 140° C.

Aspect 67. The method of Aspect 6, wherein the synthesis temperature is 120° C.

Aspect 68. The method of Aspect 6, wherein the synthesis time period is from about 0.5 to about 36 hours.

Aspect 69. The method of Aspect 6, wherein the synthesis time period is from about 1 to about 18 hours.

Aspect 70. The method of Aspect 6, wherein the synthesis time period is about 4 hours.

Aspect 71. The method of Aspect 1 or Aspect 2, wherein the reaction temperature is from about 300° C. to about 700° C.

Aspect 72. The method of Aspect 71, wherein the reaction temperature is from about 450° C. to about 550° C.

Aspect 73. The method of Aspect 1 or Aspect 2, wherein the reaction time period is about 6 hours.

Aspect 74. The method of Aspect 1 or Aspect 2, wherein in step (e), the acid composition comprises a mineral acid.

Aspect 75. The method of Aspect 74, wherein the mineral acid is nitric acid, sulfuric acid, hydrochloric acid, phosphoric acid, or combinations thereof Aspect 76. The method of Aspect 75, wherein the mineral acid comprises nitric acid.

Aspect 77. The method of Aspect 76, wherein the nitric acid is at a concentration from about 0.5 M to about 10 M.

Aspect 78. The method of Aspect 76, wherein the nitric acid is at a concentration from about 3 M to about 6 M.

Aspect 79. The method of Aspect 76, wherein the nitric acid is at a concentration of about 3 M.

Aspect 80. The method of Aspect 74, wherein step (e) is carried out for 4 hours at a temperature of 120° C.

Aspect 81. The method of Aspect 74, wherein following step (e), the product carbon and the catalyst are contacted with a second acid composition.

Aspect 82. The method of Aspect 81, wherein the second acid composition comprises nitric acid.

Aspect 83. The method of Aspect 82, wherein the second acid composition comprises concentrated nitric acid.

Aspect 84. The method of Aspect 81, wherein the product carbon and the catalyst are contacted with the second acid composition for 12 hours at 140° C.

Aspect 85. The method of Aspect 7, wherein step (h) is repeated at least four times.

Aspect 86. The method of any of the preceding claims, wherein the method has a single pass conversion; and wherein the single pass conversion is at least 5% of the methane is converted.

Aspect 87. The method of Aspect 86, wherein at least 10% of the methane is converted.

Aspect 88. The method of Aspect 86, wherein at least 40% of the methane is converted.

Aspect 89. The method of Aspect 86, wherein about 5% to about 80% of the methane is converted.

Aspect 90. The method of Aspect 86, wherein about 30% to about 55% of the methane is converted.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Figure 10A:
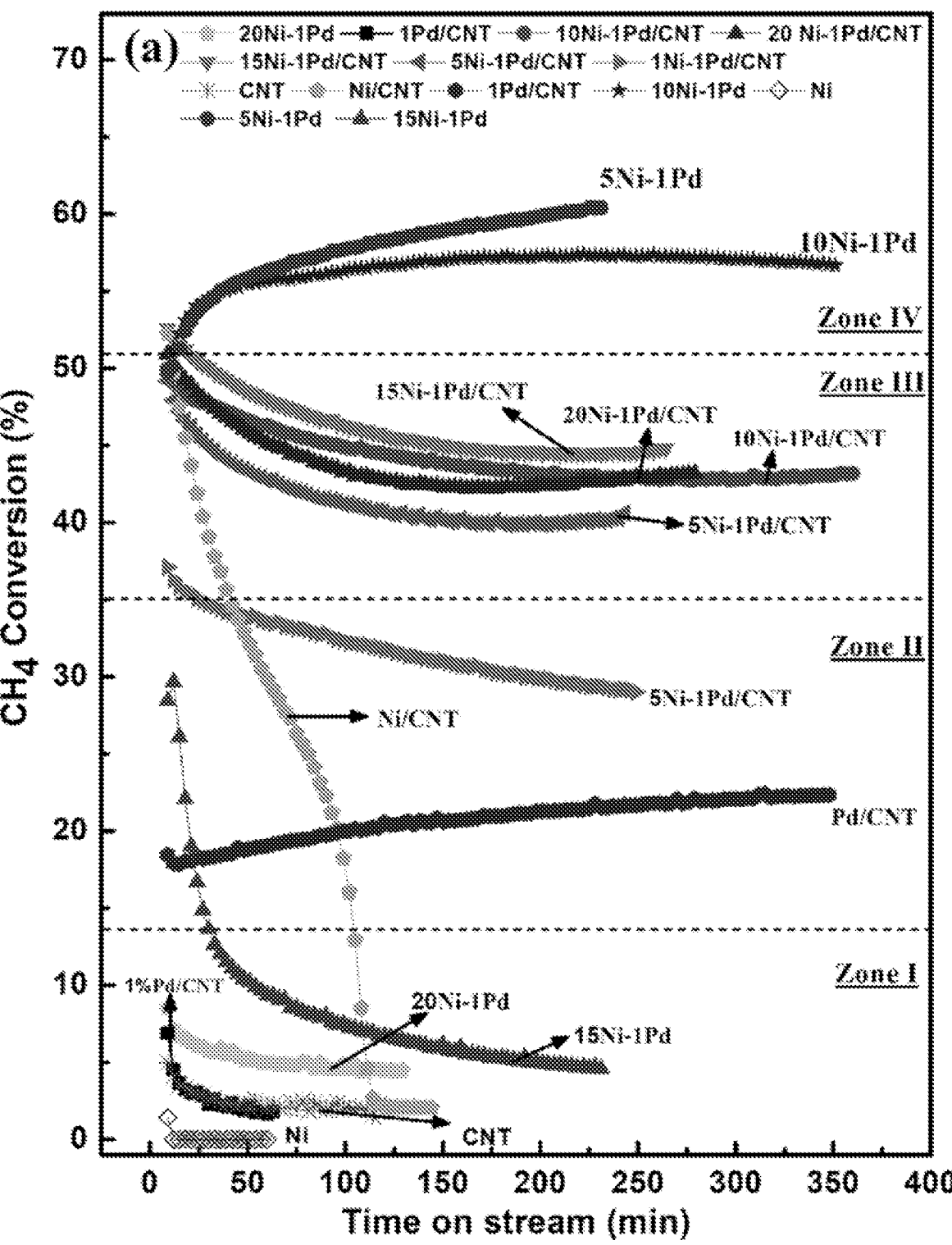
FIG. 10A shows methane conversion percentage as a function of time on stream in minutes for numerous catalyst compositions.
Figure 10B:
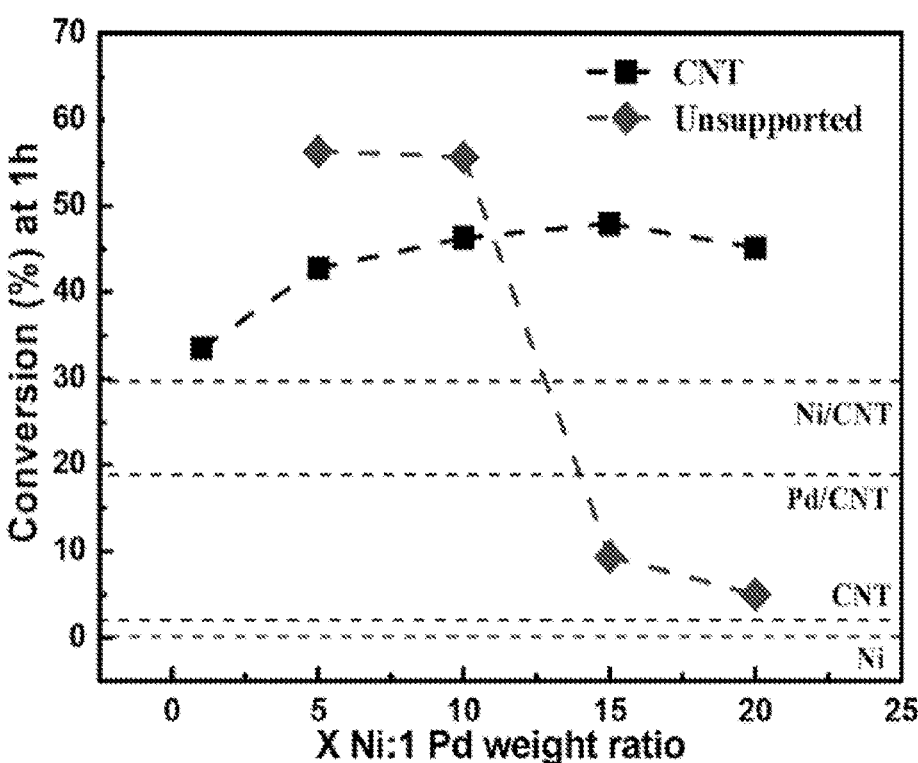
FIG. 10B shows a comparison of conversion percentages at 1 h as a function of Ni to Pd weight ratio.
Figure 10C:
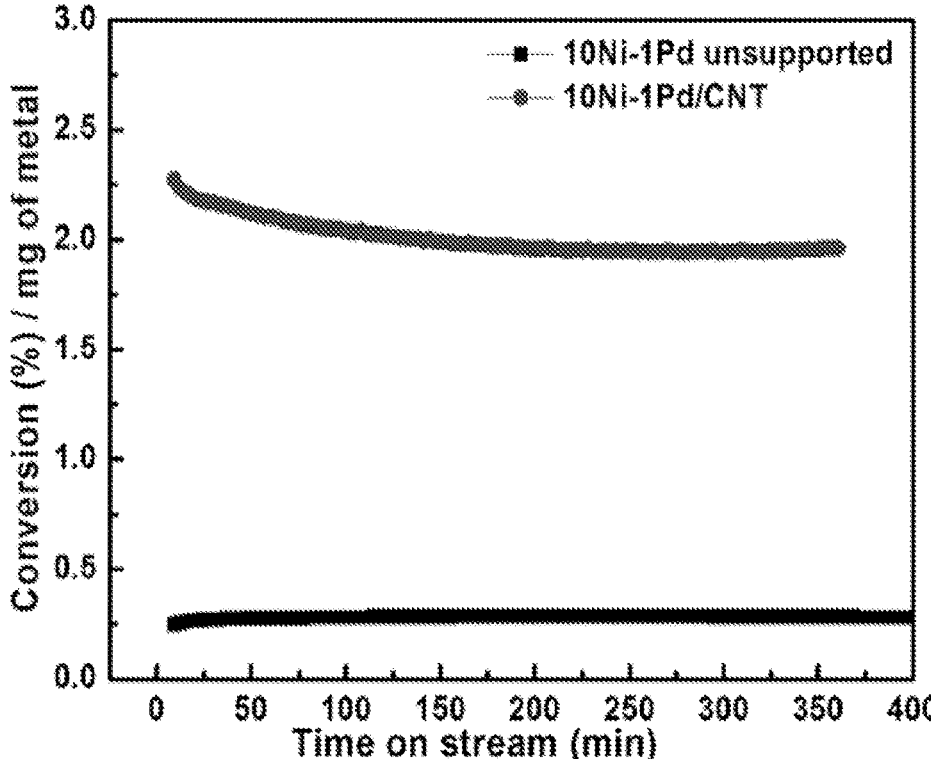
FIG. 10C shows a comparison of conversion percentage per mg of metal as a function of time on stream in minutes.

Example 1: Catalyst Preparation and Cyclic Operation 20-30 nm multiwalled carbon nanotubes (MWCNT) were purchased from Cheap Tubes, Inc. (Grafton, VT) and stirred under reflux with 70 mL concentrated $HNO_3$ at 140° C. for 12 h before synthesizing catalyst (designated H-CNT). In some experiments, MWCNT and single-walled CNT with other dimensions were used. Monometallic Ni and bimetallic Ni (10 wt %) and Pd (1 wt %) catalysts supported over H-CNT were prepared using a facile solvothermal synthesis method. Precursor compounds $Ni(NO_3)_2 \cdot 6H_2O$ and $Pd(NO_3)_2 \cdot 2H_2O$ were dissolved in 50 mL acetone and H-CNT was added into the solution. The mixture was stirred for 3 or 4 h and subsequently sonicated for 30 min. The resulting heterogeneous mixture was transferred to a 100 mL Teflon-lined stainless steel autoclave, sealed, and kept in an oven at 120° C. for 12 h. Then the mixture was cooled slowly to room temperature with the solid particles precipitating at the bottom of the container. The supernatant was slowly decanted. In some experiments, instead of decanting, the autoclave was placed in a fume hood to evaporate acetone at room temperature. Finally, the wet particles left over after the supernatant was removed by either method were dried slowly at room temperature and then transferred to an 80° C. oven for 5 h. Unsupported catalysts were prepared following essentially the same protocol; however, the metal precursors were dissolved in 100 mL solvent and a 150 mL autoclave was used for these experiments.
Pretreatment of Carbon Nanotubes Due to concerns about residual metals remaining on pristine CNT, which would affect results, CNT are typically pretreated using an acid wash as described above. In some experiments, pristine commercial CNT were used as support without acid wash. Activity is shown in FIG. 10 (zone 1). It was observed that CNT exhibited only very low activity. Our results demonstrate that using pristine CNT without pretreatment does not seem to affect performance tests.

Example 2: Catalyst Recycling

After the reaction, the spent catalysts were refluxed with 3M $HNO_3$ at 120° C. for 4 h and concentrated $HNO_3$ at 140°

Figure 8C:
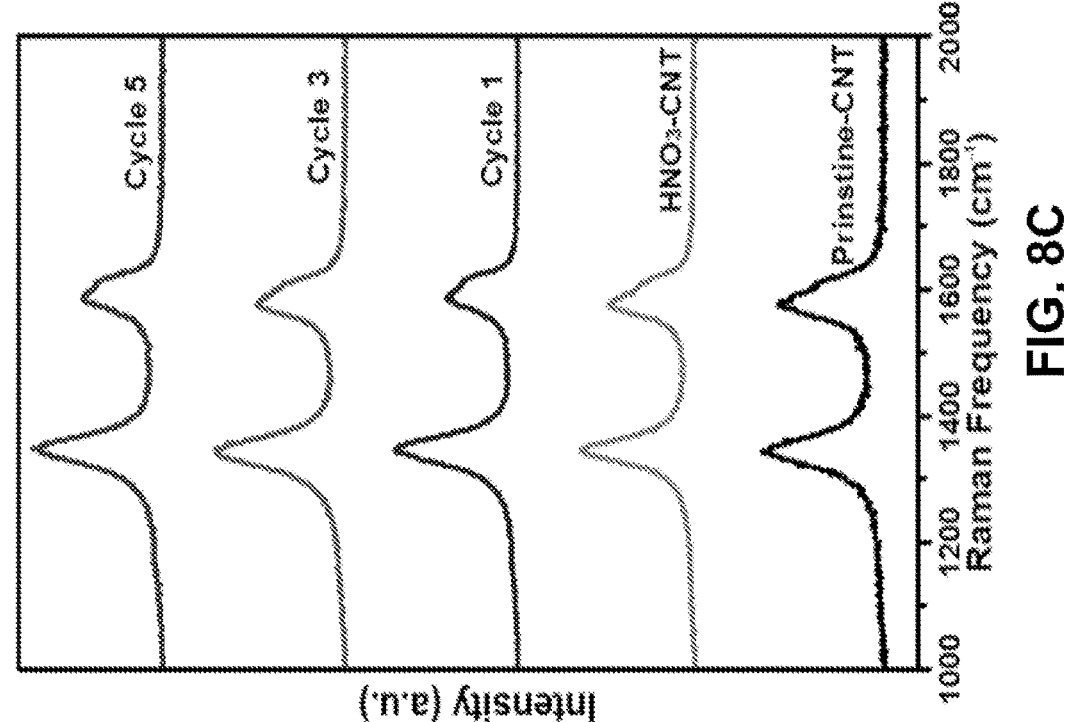
FIG. 8 shows TEM images of spent catalysts (panels (a) and (b)) and Raman spectra of 10 wt % Ni-1 wt % Pd/carbon catalyst after 1, 3, and 5 cycles as well as Raman spectra of pristine and acid treated CNT (panel (c)).
Figure 8A:
Figure 8B:
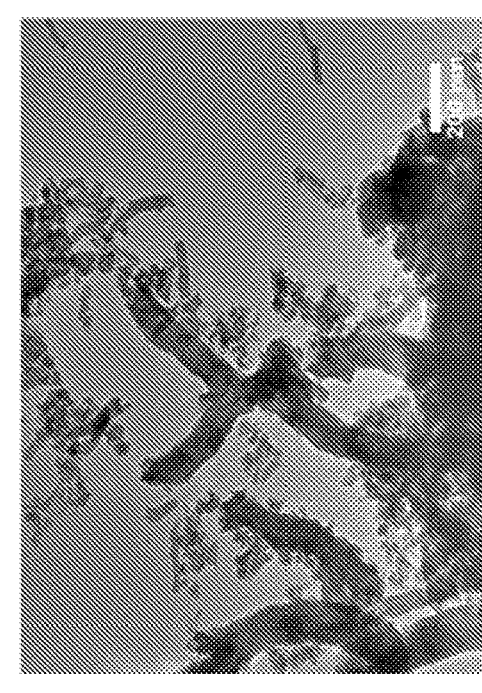

C. for 12 h under continuous agitation (i.e., magnetic stirring). After the reflux, the carbon particles were filtered and washed with deionized water. Then, the carbon particles were dried at 80° C. and some portion of carbon particles were ready for the next cycle. The preparation of fresh catalysts for the following cycles was the same as for the first cycle by the solvothermal synthesis method described previously. FIG. 1 shows the steps for an example process as described herein. Spent catalysts were characterized by TEM; images of the catalyst sample after 5 cycles are shown in FIG. 8 (panels (a) and (b). After 5 cycles, only CNTs and CNFs were produced, with other types of carbon structures not being observed.

Quality of growing carbon from each cycle was examined by Raman spectroscopy. After acid treatment, the ID/IG ratio increases since strong acids can cause defects or breaks in CNT/CNF. For spent catalysts obtained from cycles 1, 3, and 5, the ID/IG ratio is around 0.85 (see FIG. 8 (panel (c))). Thus, the quality of the carbon nanomaterials produced essentially does not change after 5 cycles of operation.

Example 3: Reactor Apparatus and Methane Decomposition Conditions

Methane decomposition experiments were carried out in a fixed-bed vertical quartz reactor (inner diameter 10 mm, outer diameter 12 cm, and length 44.5 cm) heated by an electric tube furnace. Cycle time was 6 hours. Quartz wool was used to physically hold the catalyst inside the reactor tube. Experimental conditions were as follows: Prior to the reaction, the catalysts were reduced at 400° C. with 10% $H_2$ in $N_2$ for 4 h. Total gas flow rate was 30 mL/min with 30% $CH_4$ in $N_2$ and was controlled by a mass flow meter controller. For each run, the amount of catalyst was 0.2 g and catalytic activity tests were performed at 600° C. with a heating rate of 10° C./min. The composition of outflow gas was analyzed using a Perkin-Elmer Arnel Clarus 500 gas chromatograph equipped with a thermal conductivity detector and a 4-channel MicroGC Fusion Gas Analyzer (Inficon) . GC data was collected and processed using TotalChrom Workstation software (Perkin-Elmer).

Example 4: Effect of Process Variables on Catalytic Activity

Catalytic Activity as a Function of Time

Figure 2A:
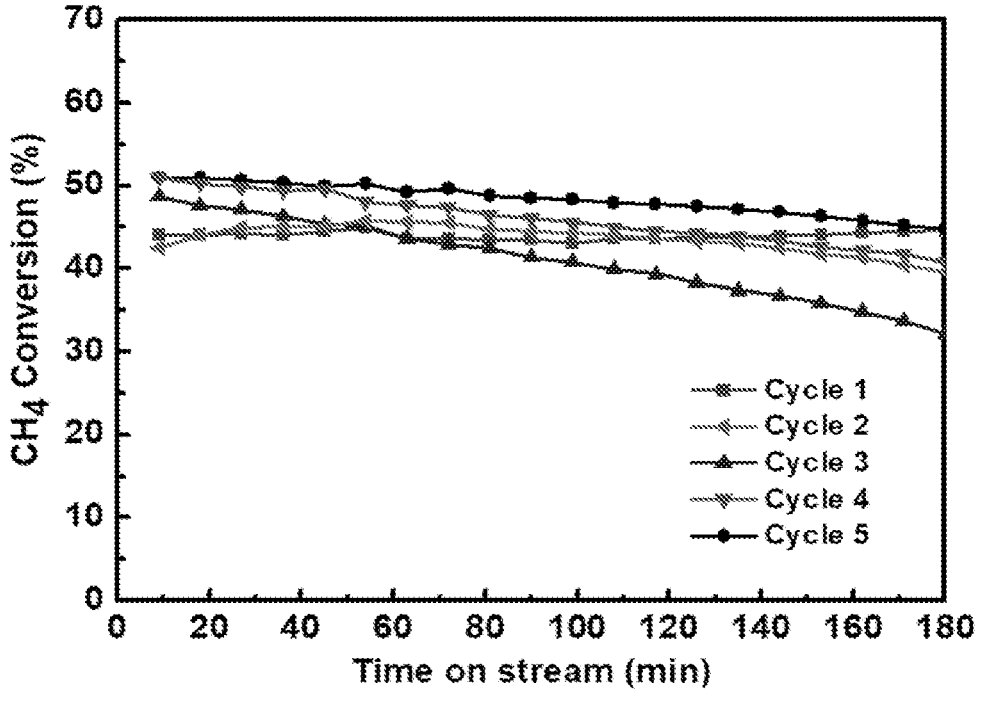
FIG. 2 shows catalytic decomposition of methane at 600° C. (a) for five consecutive reaction-regeneration cycles over Ni—Pd/C catalysts and (b) over Ni and Ni—Pd/C catalysts.
Figure 2B:
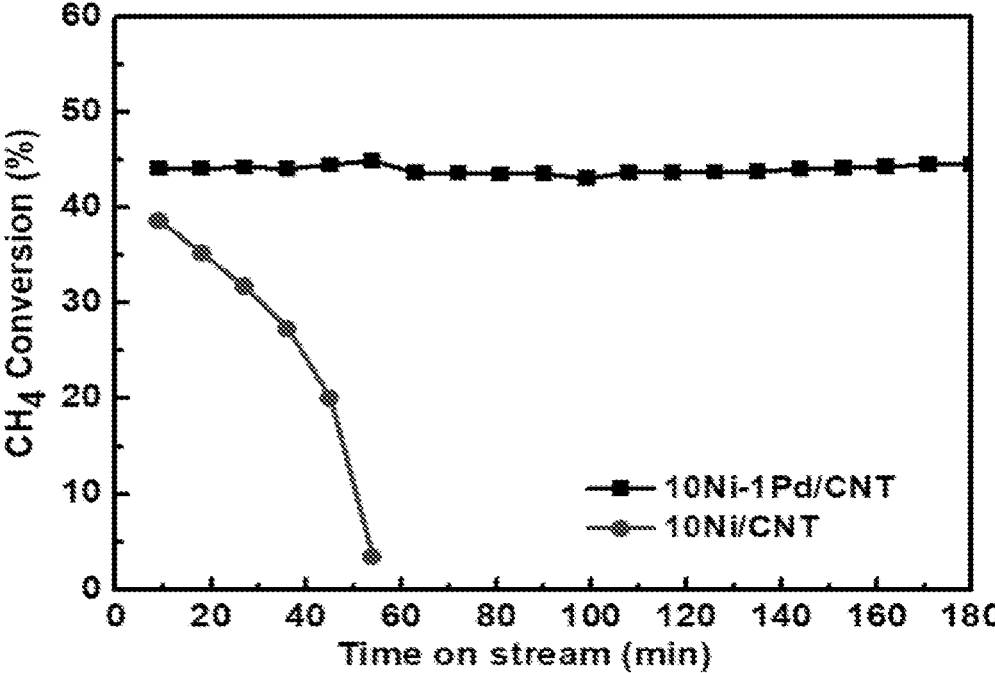

Catalytic activity as a function of time on stream is shown in FIG. 2. Compared to 10 wt % Ni/CNT catalyst, bimetallic 10 wt % Ni-1 wt % Pd/CNT catalyst was more active, with higher conversion and higher stability. The Ni/CNT catalyst performed poorly, with conversion decreasing from approximately 39% to almost complete deactivation (see FIG. 2, panel (b)). Thus, the 10 wt % Ni-1 wt % Pd/CNT catalyst represents a large improvement in catalytic performance. After five consecutive reaction-regeneration cycles, the 10 wt % Ni-1 wt % Pd/CNT catalyst maintained the same level of activity and selectivity (see FIG. 2, panel (a)).

Catalytic Activity as a Function of Ni/Pd Ratio

To understand the efficiency of the Ni—Pd system in thermal catalytic decomposition (TCD), supported and unsupported Ni—Pd catalysts with various Ni/Pd ratios were synthesized and tested at 600° C. Results are presented in FIG. 10. FIG. 10 is split into four horizontal zones based on the values of conversion.

Monometallic catalysts were synthesized and tested to establish baselines for comparison with bimetallic catalysts. Performance results of monometallic and Ni/CNT and Pd/CNT catalysts are shown in FIG. 10 (zones 1 and 2). As expected, Ni/CNT was unstable and deactivated in about 1.5 h. Although the Ni catalyst has a high initial activity for the methane decomposition reaction, but this activity was not retained for a long duration. By contrast, Pd/CNT exhibited good stability for 6 h time-on-stream operation, but methane conversion, at 21%, appeared to be much lower than for bimetallic catalysts (FIG. 10). These results revealed that none of the monometallic catalysts tested exhibited reasonable performance.

Alloy catalysts' activities are shown in FIG. 10 (zones 2 and 3). These alloy catalysts show dramatic improvement in catalytic performance compared with monometallic catalysts. 5 Ni-1 Pd/CNT, 10 Ni-1 Pd/CNT, 15 Ni-1 Pd/CNT, and 20 Ni-1 Pd/CNT catalysts exhibit conversion between 40 and 45% and their stability was maintained for at least 4 h time-on-stream. When the Ni/Pd ratio is decreased to 1:1, the alloy (referred to as 1 Ni-1 Pd/CNT) shows an initial conversion of 38% but decreases gradually with time on stream. Bimetallic alloy catalysts thus exhibit higher activity and higher stability compared to monometallic catalysts, indicating synergistic effects.

Catalytic Activity Based on Presence or Absence of Support

Performance tests using unsupported Ni—Pd catalysts were conducted to study the effects of the CNT support and the effect of Pd on methane conversion. Results are shown in FIG. 10 (zones 1 and 4). Comparing a 10 Ni-1 Pd/CNT catalyst to a 10 Ni-1 Pd catalyst revealed the effects of the CNT support, since both catalysts have the same ratio of Ni and Pd but different metal loading, with 0.022 g total metal loading for CNT supported catalyst and 0.2 g total metal loading for the unsupported catalyst. Methane conversion on these two catalysts are 43% and 56% respectively. Thus the 10-fold difference in the amount of the metal on an unsupported catalyst does not improve the conversion significantly. Similarly, the catalytic performance of unsupported 5 Ni-1 Pd does not show an obvious enhancement of specific activity in terms of methane conversion/mg metal over supported catalyst. Although these two unsupported catalysts have lower specific activity than supported catalyst, they are still active and stable for the methane decomposition reaction.

Performance results of unsupported catalysts were also evaluated to elucidate the effects of the small amount of Pd, since influence from the CNT support was eliminated. The higher Ni-content catalysts (e.g., 15 Ni-1 Pd and 20 Ni-1 Pd) exhibit very low conversion of around 5%, which is the lowest performance in contrast with 10 Ni-1Pd, 5 Ni-1 Pd, and their supported catalysts. These results indicate that, without the CNT support, loss of both activity and stability could be an issue. These results further demonstrate that both CNT support and Pd play important roles in improving catalyst properties.

Effect of Temperature on Catalytic Activity

Figure 11:
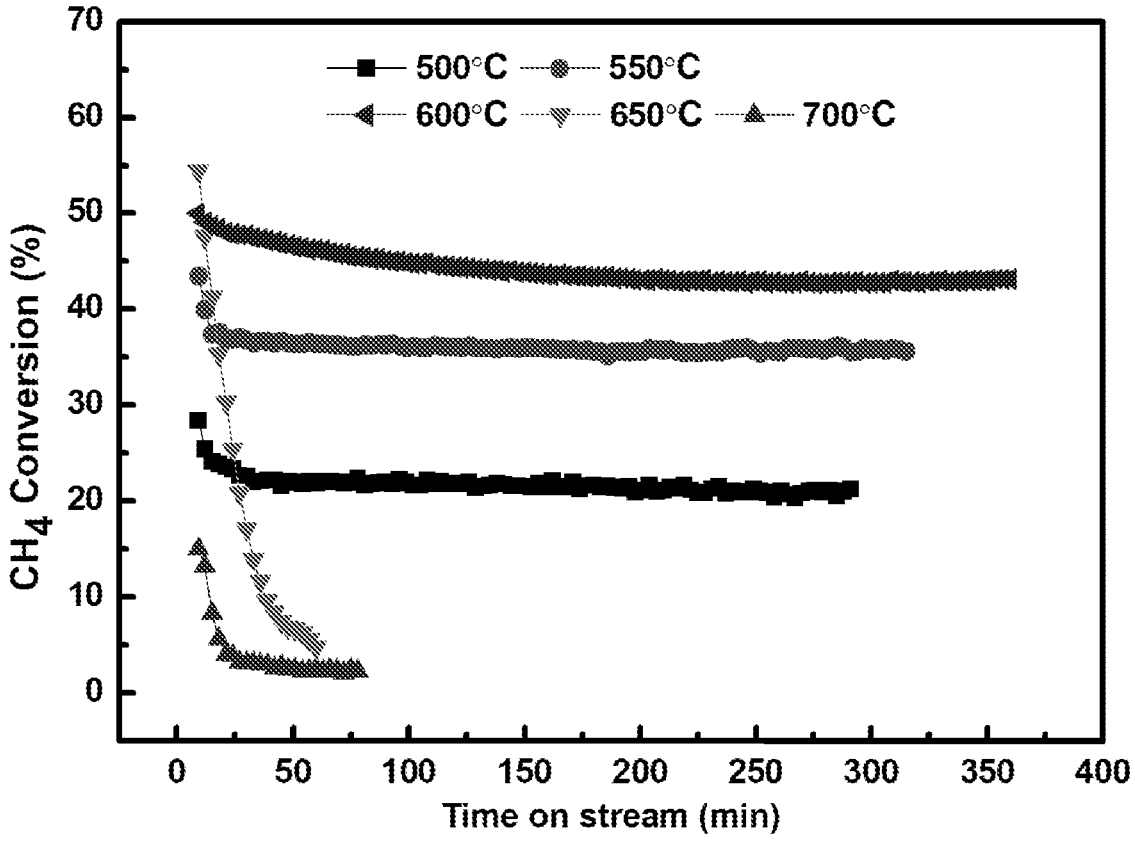
FIG. 11 shows the effect of temperature on the performance of a 10 wt % Ni, 1 wt % Pd catalyst supported on CNT.

Stable activity for 10 Ni-1 Pd/CNT is observed over the temperature range of 500-600° C. (FIG. 11). Upon raising the reaction temperature to 650° C., an initial conversion of 54% is achieved, although the catalyst becomes deactivated within one hour. This indicates active sites on the catalyst may be covered with carbon and thus the catalyst does not continue to grow as CNT or CNF.

Example 5: Characterization of Catalysts

Electron Microscopy

Figure 3:
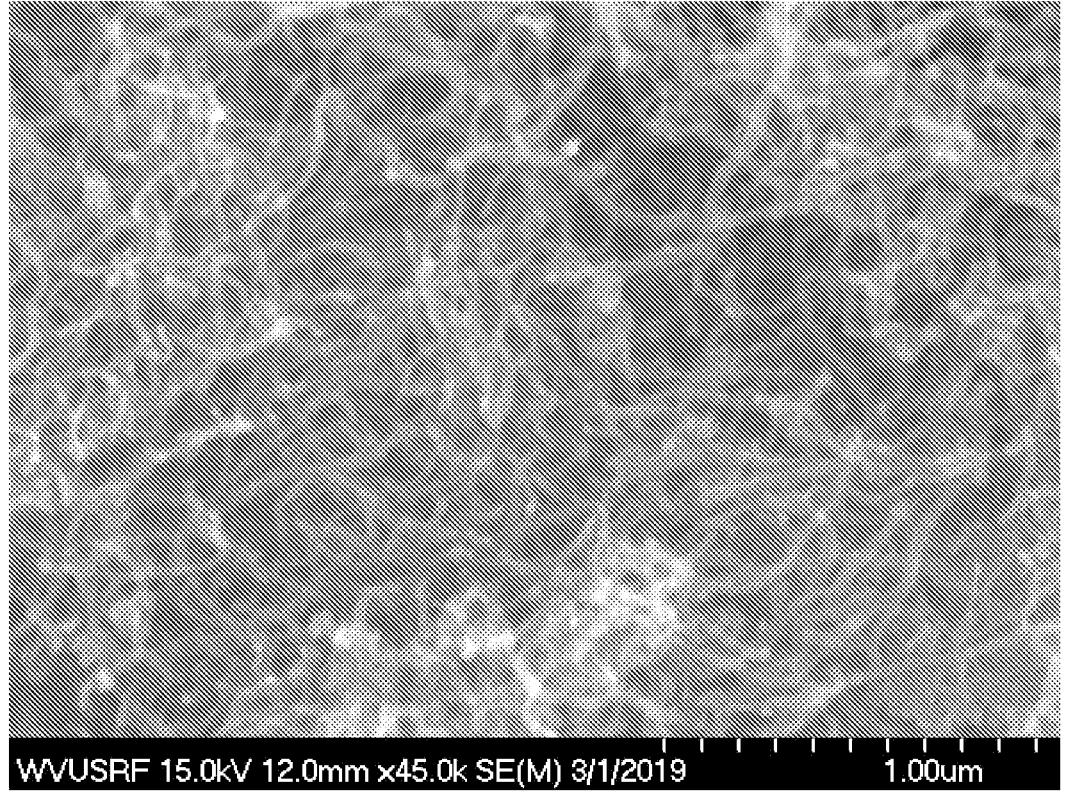
FIG. 3 shows pristine carbon nanotubes for first cycle catalyst preparation.
Figure 4A:
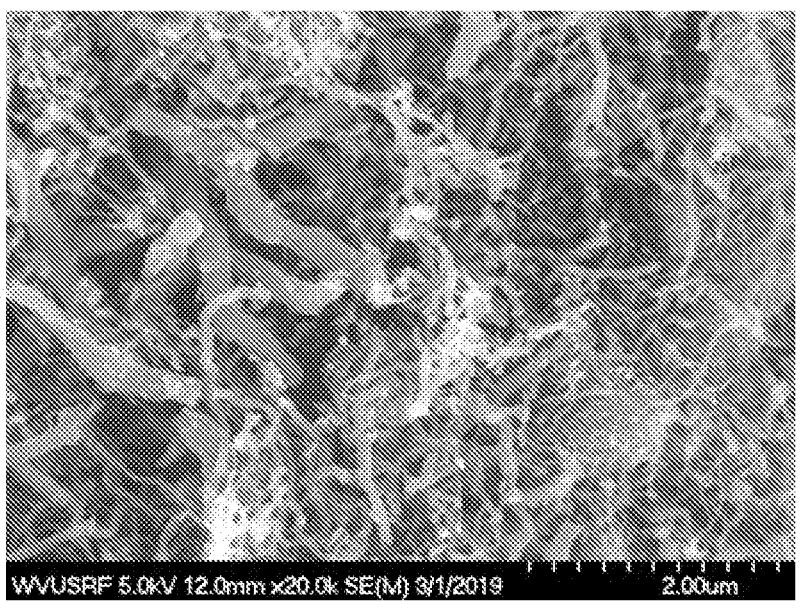
FIG. 4 shows scanning electron microscope (SEM) images of the production of carbon nanomaterials over 10 wt % Ni-1 wt % Pd/carbon catalyst at 600° C. (both (a) and (b)).
Figure 4B:
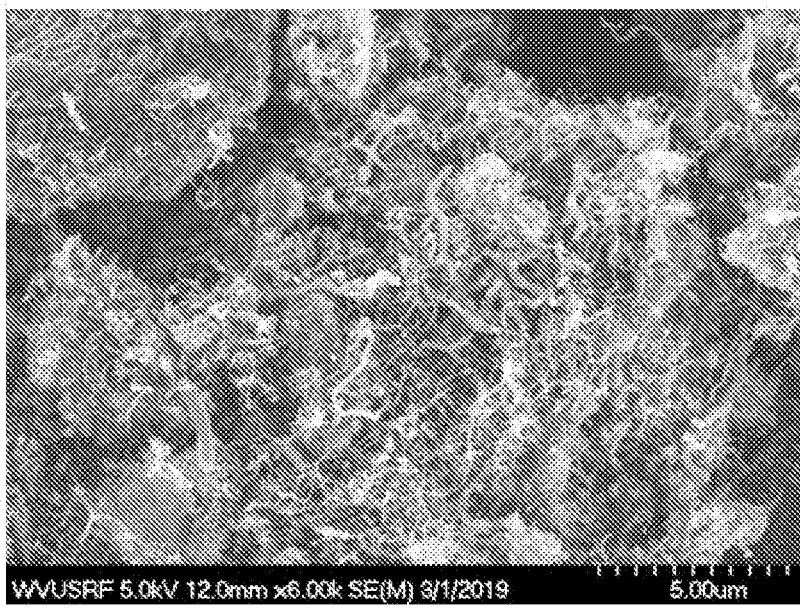
Figure 5A:
FIG. 5 shows transmission electron microscope (TEM) images of the production of carbon nanomaterials over 10 wt % Ni-1 wt % Pd/carbon (fifth cycle) catalyst at 600° C. (panels (a), (b), and (c)).
Figure 5B:
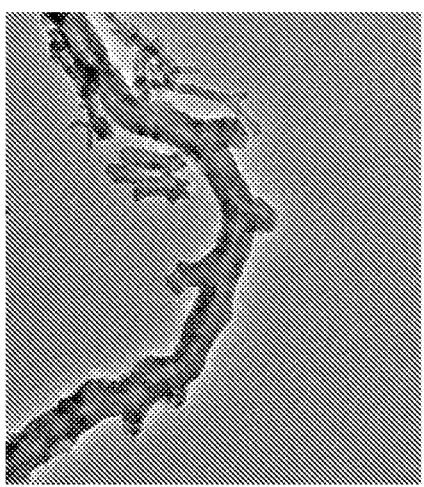
Figure 5C:
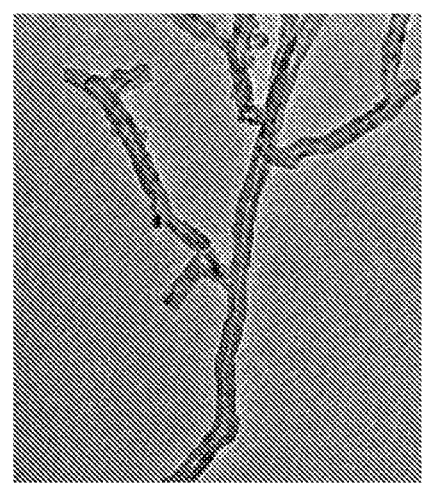

Morphologies of CNT and CNF were studied using electron microscopy. A transmission electron microscope (TEM) was used to observe the morphologies of the catalysts and the produced carbon materials. Samples were prepared by sonicating in an acetone or an isopropanol solution for 15 min, then placing a few drops of suspension on a TEM grid for analysis. TEM images were taken in a JEOL JEM-2100 instrument operated at an accelerating voltage of 200 kV. A SEM image of pristine CNT used for the first cycle reaction is shown in FIG. 3. Growth of CNT/CNF after methane decomposition is confirmed in SEM images in FIG. 4, which shows randomly entangled CNT/CNF having different diameters and lengths. TEM images of spent catalyst following the fifth reaction cycle are seen in FIG. 5, showing solid rods (CNF) and thick walls (multiwalled CNT).

Scanning transmission electron microscopy (STEM) was further performed to prove alloy formation suspected from X-ray diffraction studies. Elemental mapping of the particles was also performed. Lattice spacing of Ni—Pd catalyst is different than for pure Ni and Pd metals.

Figures 12A, 12B, 12C, 12D, 12E, 12F:
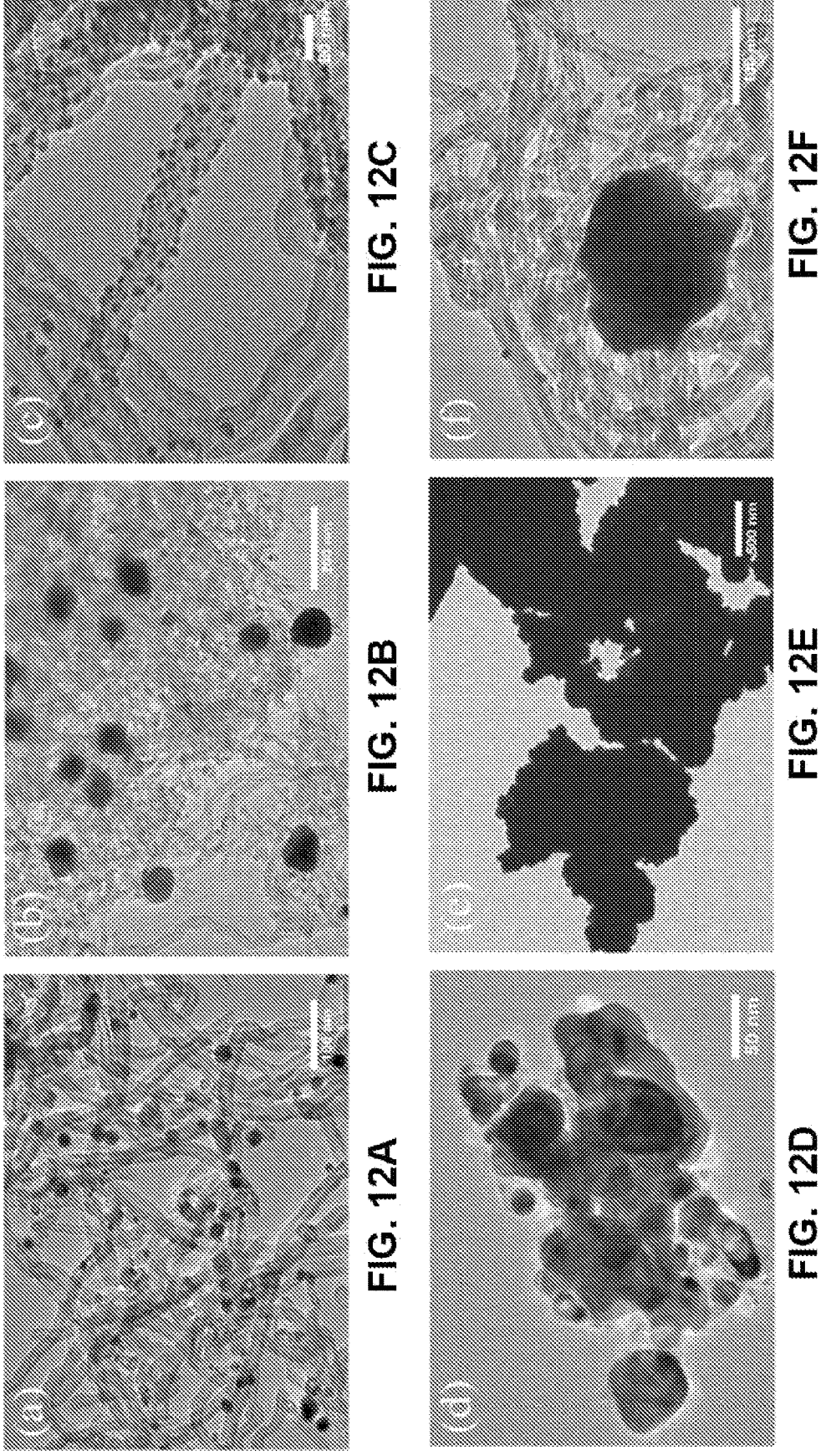
FIG. 12 shows TEM images of reduced catalysts: (a) 10 Ni-1 Pd/CNT, (b) Ni/CNT, (c) and (f) Pd/CNT, (d) unsupported 10 Ni-1 Pd, and (e) unsupported Ni.

To ascertain the effects of CNT support and Pd loading in bimetallic catalysts on system performance, TEM and SEM characterization were carried out. Particle size and distribution were significantly different for the catalysts evaluated. It was hypothesized that the support would prevent metal agglomeration. Reduced Ni/CNT and unsupported Ni catalysts exhibit distinguishable changes in particle size (FIG. 12. Round shaped metal particles with diameters of from about 50-100 nm are observed with the Ni/CNT catalyst. However, with the unsupported Ni catalyst, large chunk-size agglomerates with diameters of hundreds of nm are observed. TEM measurements are consistent with catalytic performance results where large particles are inactive for methane decomposition. On a metal basis, methane conversion over Ni/CNT catalyst is higher than over the unsupported Ni catalyst.

The effect of adding Pd to Ni/CNT catalyst on catalyst morphology was analyzed. TEM images of reduced Ni/CNT and Pd/CNT show that Ni particles on Ni/CNT are round shaped with diameters of 80-100 nm, while most of the Pd particles on CNT are less than 5 nm in diameter (see FIG. 12. Moreover, the particle size of unsupported 10 Ni-1 Pd is around 50-100 nm, while the unsupported Ni particles appear to be large agglomerates of over 500 nm. Similar results are observed for the Ni/CNT and 10 Ni-1 Pd/CNT catalysts where the presence of low Pd decreases particle size.

Figure 13:
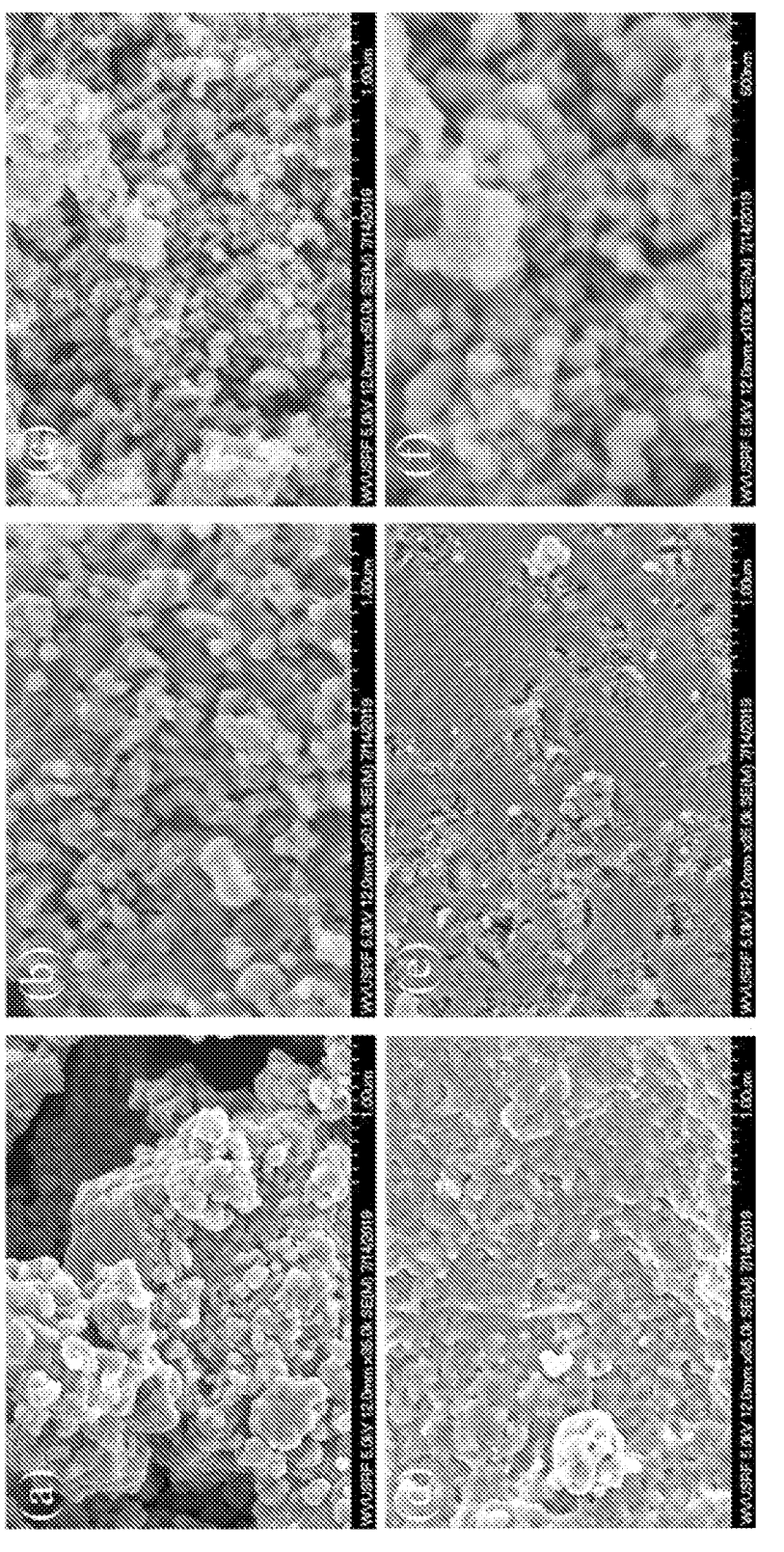
FIG. 13 shows SEM images of unsupported catalysts after reduction: (a) and (d) Ni, (b) and (e) 15 Ni-1 Pd, and (c) and (f) 10 Ni-1 Pd.

Meanwhile, a comparison of SEM images of Ni, 10 Ni-1 Pd and 15 Ni-1 Pd shows that the degree of agglomeration changes with Pd loading (see FIG. 13). For the bimetallic catalysts supported on CNT, the effect of the Pd/Ni ratio on the change in morphology may not be observed obviously because the catalyst particles are well distributed on CNT support. However, the effect of Pd was expected to show on unsupported 10 Ni-1 Pd and 15 Ni-1 Pd. Methane conversion on unsupported 10 Ni-1 Pd is much higher than on 15 Ni-1 Pd and SEM analysis shows agglomeration on 15 Ni-1 Pd is more severe than on 10 Ni-1 Pd (FIG. 13. Small spherical particles can still be observed on 10 Ni-1 Pd but the stronger sintering behavior is seen on 15 Ni-1 Pd. SEM images of unsupported Ni show that the neighboring spherical-shaped particles are all sintered and agglomerated (FIG. 13). These results indicate that CNT functions to improve metal distribution, while addition of Pd to Ni enhances resistance to sintering.

X-Ray Diffraction Studies

Figure 6A:
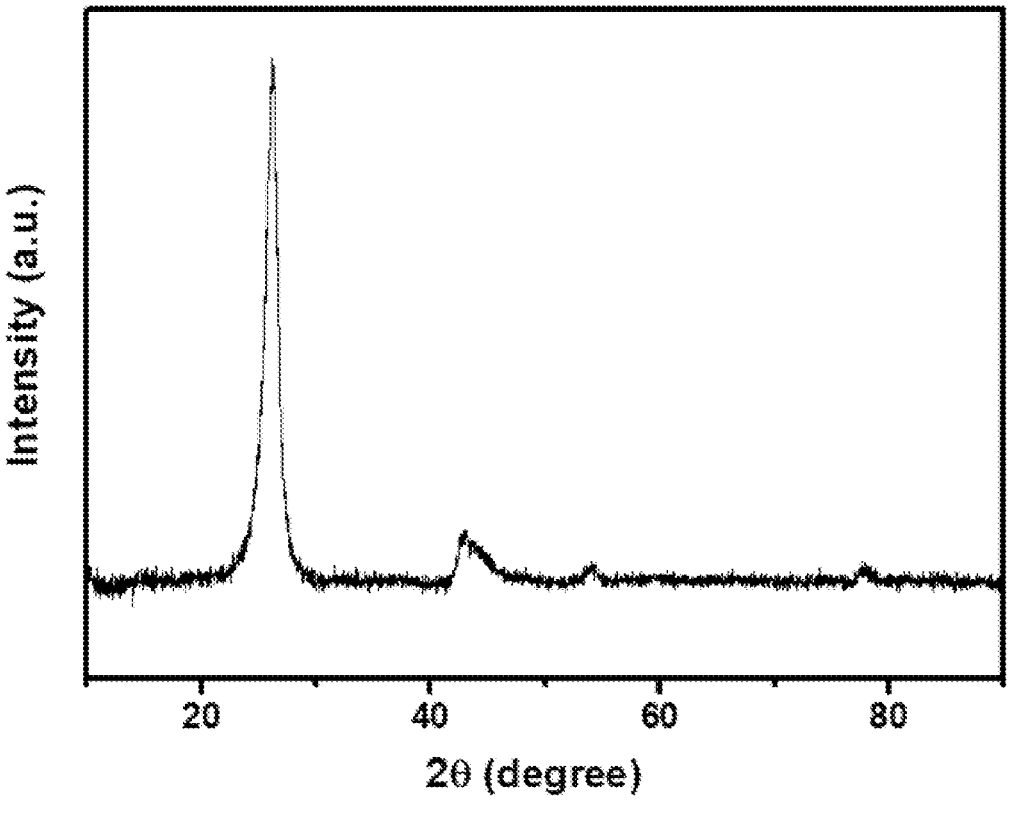
FIG. 6 shows X-ray diffraction (XRD) patterns for (a) pristine carbon nanotubes after acid treatment and (b) cycle 1, 3, and 5 catalysts after methane decomposition.
Figure 6B:
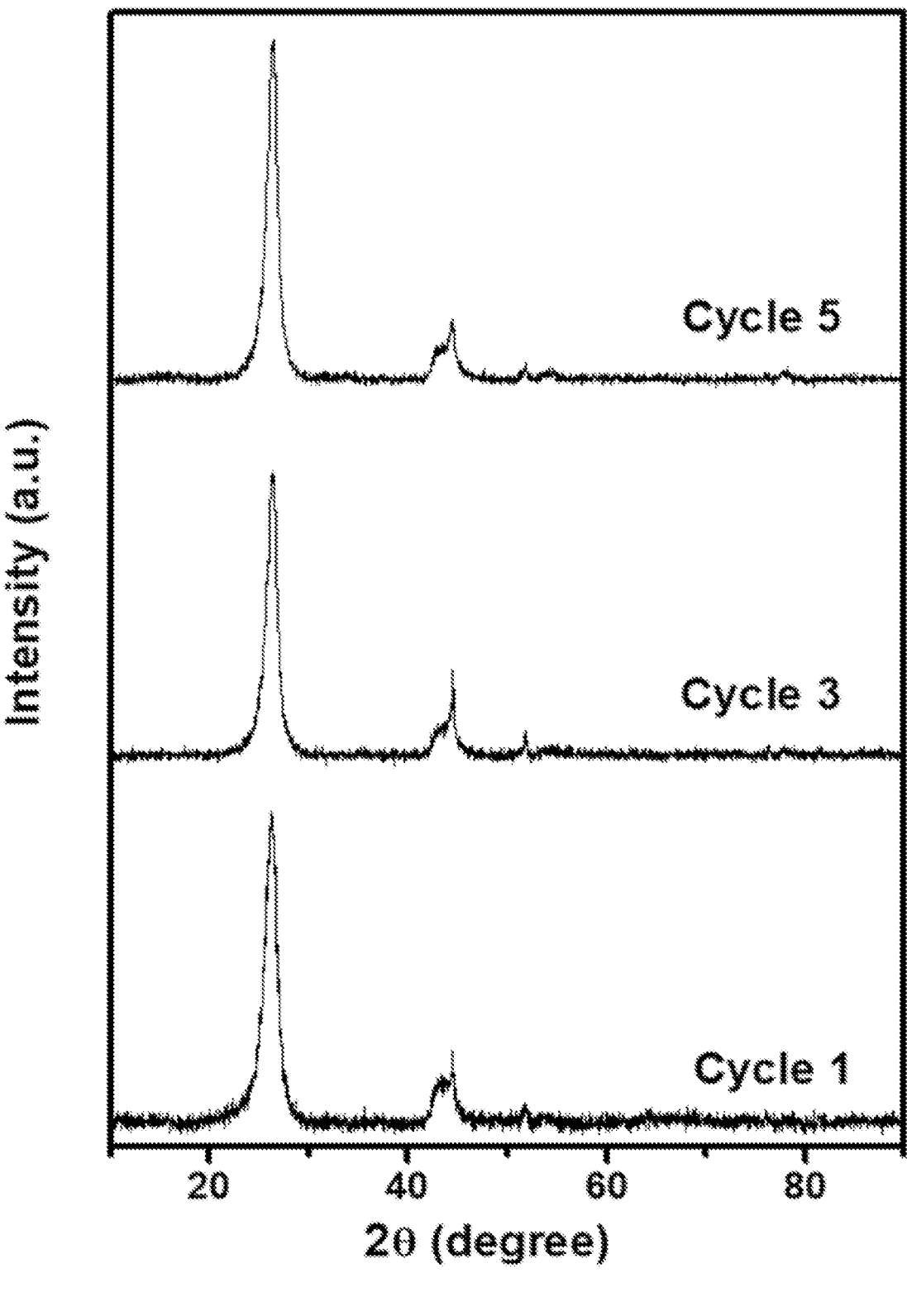

To analyze the crystal structures of the catalysts, X-ray diffraction (XRD) was performed using a PANalytical X'Pert Pro X-Ray Diffractometer using a Cu-Kα source (45 kV and 40 mA) (see FIG. 6). Diffraction peaks at 2θ=26.1°, 42.5°, 54.0°, and 77.8° were assigned to the (002), (100), (004), and (110) planes of the graphite structure of the CNTs (FIG. 6, panel (a)). The d-spacing of the CNTs calculated from Bragg's equation was approximately 0.34 nm, indicating the distance between adjacent graphene layers. For spent catalysts after cycles 1, 3, and 5, the sharp (002) peak was still observed after the methane decomposition, indicating that the newly-grown carbon nanomaterials were crystalline rather than amorphous in structure (FIG. 6, panel (b)).

Figure 9:
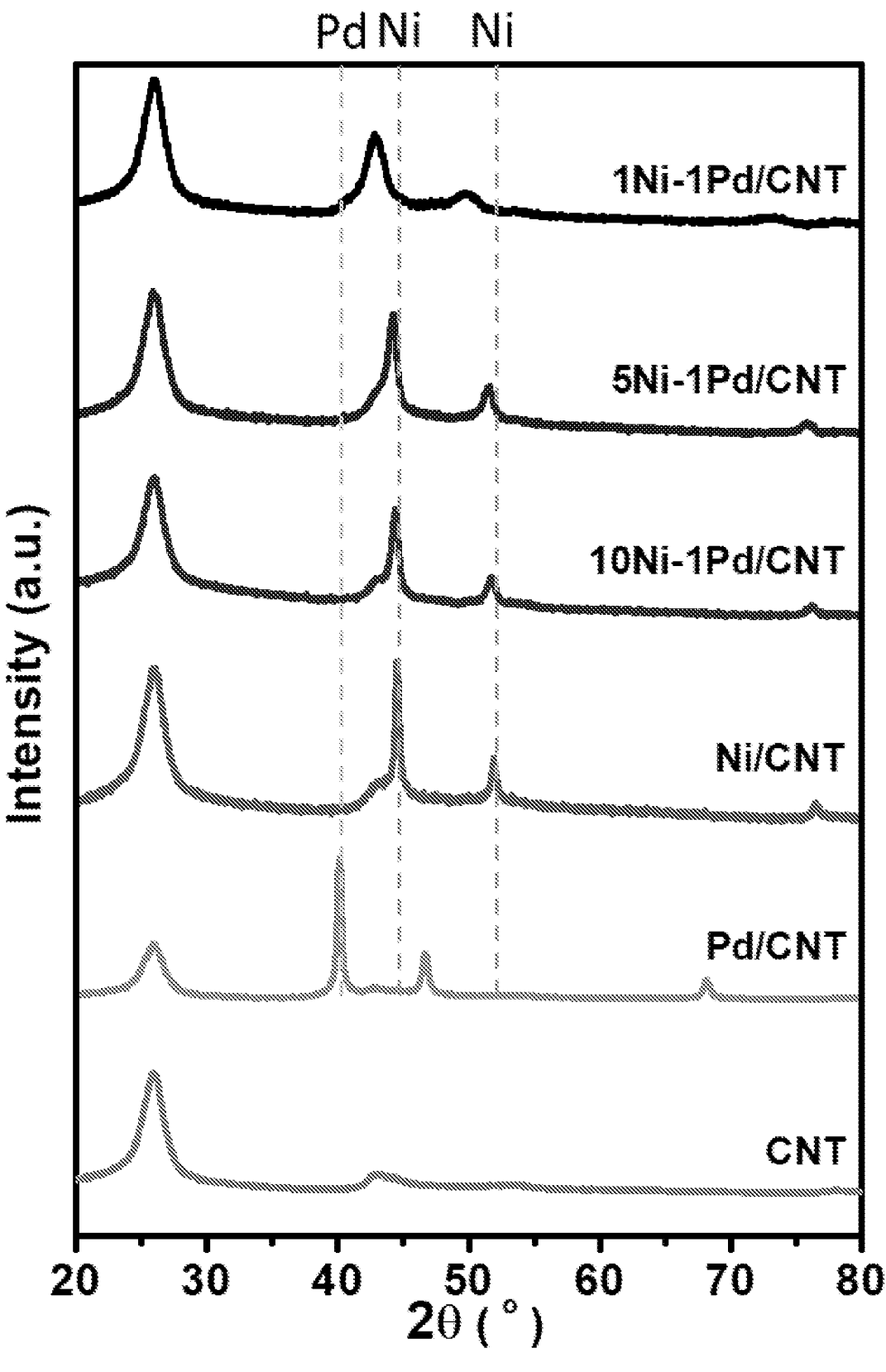
FIG. 9 shows XRD patterns of reduced catalysts. From bottom to top: CNT alone, Pd/CNT, Ni/CNT, 10 Ni-1 Pd/CNT, 5 Ni-1 Pd/CNT, and 1 Ni-1 Pd/CNT, where a number before a metal symbol indicates the weight percent of that component in the catalyst/CNT mixture. When no number appears, that metal was present in an amount of 10 wt % of the metal/CNT mixture.

The crystal structure of as-reduced CNT-supported catalysts was characterized by XRD (FIG. 9). Both monometallic Ni and Pd supported on CNT show their characteristic peaks in XRD. The 2θ at around 26.0° and 43.0° are ascribed to (002) and (100) planes of graphitic CNT. The 2θ at 40.1° (111), 46.7° (200), and 68.1° (220) are associated with face-centered cubic (FCC) Pd, and 2θ at 44.5° (111), 51.8° (200), and 76.4° (220) are ascribed to FCC metallic Ni.

For the bimetallic on CNT support catalysts, the XRD patterns do not show peaks corresponding to Pd metal but the spectra are quite similar to the Ni XRD pattern. According to the Ni—Pd binary phase diagram, Ni and Pd can form a solid solution with FCC structure for any composition at 400° C. It is postulated that, at low concentrations, Pd was homogeneously distributed and immersed in the solid solution and therefore the XRD characteristic peaks disappeared.

Thermogravimetric Analysis

Figure 7:
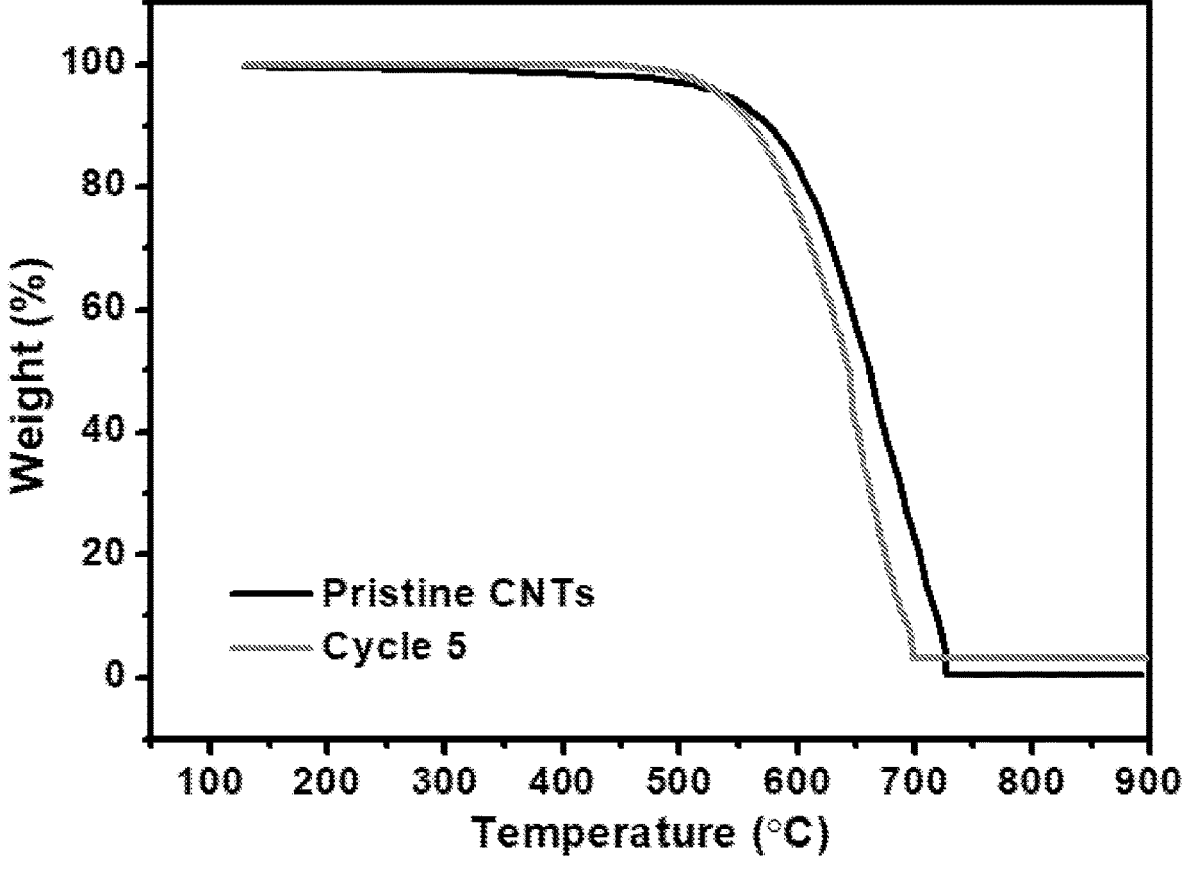
FIG. 7 shows thermal stability of pristine carbon nanotubes (black line) and carbon deposited of the last cycle of spent 10 wt % Ni-1 wt % Pd/carbon catalyst (gray line).

Thermal stability and purity of the catalysts were studied by thermogravimetric analysis (TGA) using a TA Instruments SDT 650 Analyzer with a 10° C./min heating rate up to 900° C. in a 5% oxygen in helium atmosphere with a flow rate of 30 mL/min. In some experiments, the flow rate was 100 mL/min. Catalysts were analyzed in a 5% $O_2$/He atmosphere. Studies of spent catalyst after the fifth cycle are shown in FIG. 7. If carbon deposited on the catalyst was amorphous, it would be expected to decompose into CO or $CO_2$ in an $O_2$ atmosphere. It is also possible that the catalyst species can be oxidized under these conditions. No thermal degradation was observed over the temperature range of 200-350° C., which corresponds to amorphous carbon, thus confirming that the carbon deposited on the catalyst was not amorphous. Observed weight loss (see FIG. 7) corresponds to higher crystalline carbon nanomaterials deposited on the catalyst. Results were compared to thermal stability of pristine carbon nanotubes. TGA results were in line with XRD results indicating the formation of crystalline structures.

Raman Spectroscopy

Raman analysis was performed using a Renishaw InVia Raman Microscope with an excitation wavelength of 532 nm (see FIG. 8, panel (c)). The Raman spectrum presented the characteristic features of graphite structures, with a D-band at about 1345 cm$^{-1}$ arising from defects or disordered structures and a G-band at about 1580 cm$^{-1}$ arising from the stretching of a C—C bond, suggesting crystalline order in graphite structures. A shoulder band at 1610 cm$^{-1}$ was labeled as the D' band, reflecting disordered carbon structures. The intensity ratio of both D and G bands reflected the quality of the graphite structure. Examining cycle 1, 3, and 5 catalysts shows that the intensity of the Raman spectrum did not appreciably change (FIG. 8, panel (c)).

Example 6: Characterization of Spent Catalysts and Carbon Nanomaterials

Electron Microscopy

Figure 14:
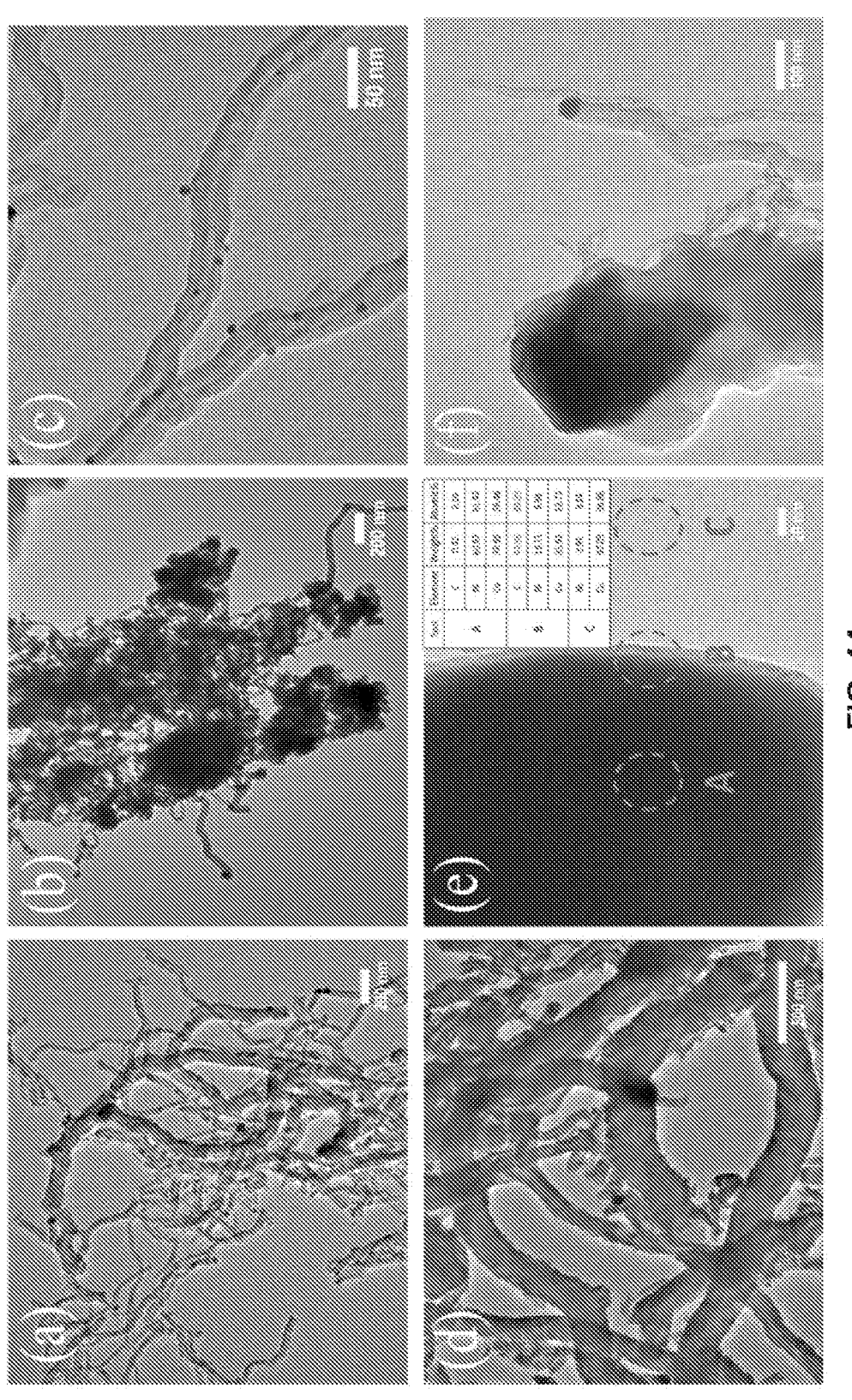
FIG. 14 shows TEM images of spent catalysts: (a) 10 Ni-1 Pd/CNT, (b) Ni/CNT, (c) and (f) Pd/CNT, (d) unsupported 10 Ni-1 Pd, and (e) unsupported Ni with TEM-EDS results (inset).

TEM and SEM analyses were carried out to characterize the morphologies of spent catalysts as well as of the produced carbon nanomaterials. Produced CNTs/CNFs can be easily identified and distinguished from pristine CNT used as support based on their structures and diameters. Stability of Ni/CNT is poor and a TEM image shows coke formation on metal particles, which may be the cause of deactivation (FIG. 14). It was determined that the spent Ni/CNT could form multiwalled carbon nanotubes (MWCNT), or hollow cylinder filaments, where the diameter of the MWCNT was close to the nickel particle size. The metal particle at the tip of the CNT was reconstructed to a pear shape (FIG. 4).

TEM images show that spent Pd/CNT with a particle size of less than 5 nm does not form CNT or CNF since these particles may be too small to support CNT or CNF formation (FIG. 14). Some larger particles were observed over the Pd/CNT; they form as solid colored filament or CNF as seen in FIG. 14 (panel f). It was observed that the surface of the CNF was not smooth and some protruding branches were observed (FIG. 4). The diameters of these CNF were larger than the Pd metal particle size. It is speculated that the presence of Pd facilitates assembly of carbon and could therefore prevent the catalyst surfaces from coking. CNFs were also observed on spent 10 Ni-1 Pd/CNT catalyst, which is more similar with the carbon on the spent Pd/CNT. All the CNTs/CNFs produced were produced by tip growth, indicating weak metal-support interaction. Very low methane conversion was observed on an unsupported Ni catalyst. TEM shows layers of coke on the Ni surface and TEM-EDS confirmed this was amorphous carbon. Carbon atoms accumulated on the metal surface in this instance and could not precipitate as crystalline filamentous structures due to the formation of large Ni agglomerates.

Figure 15:
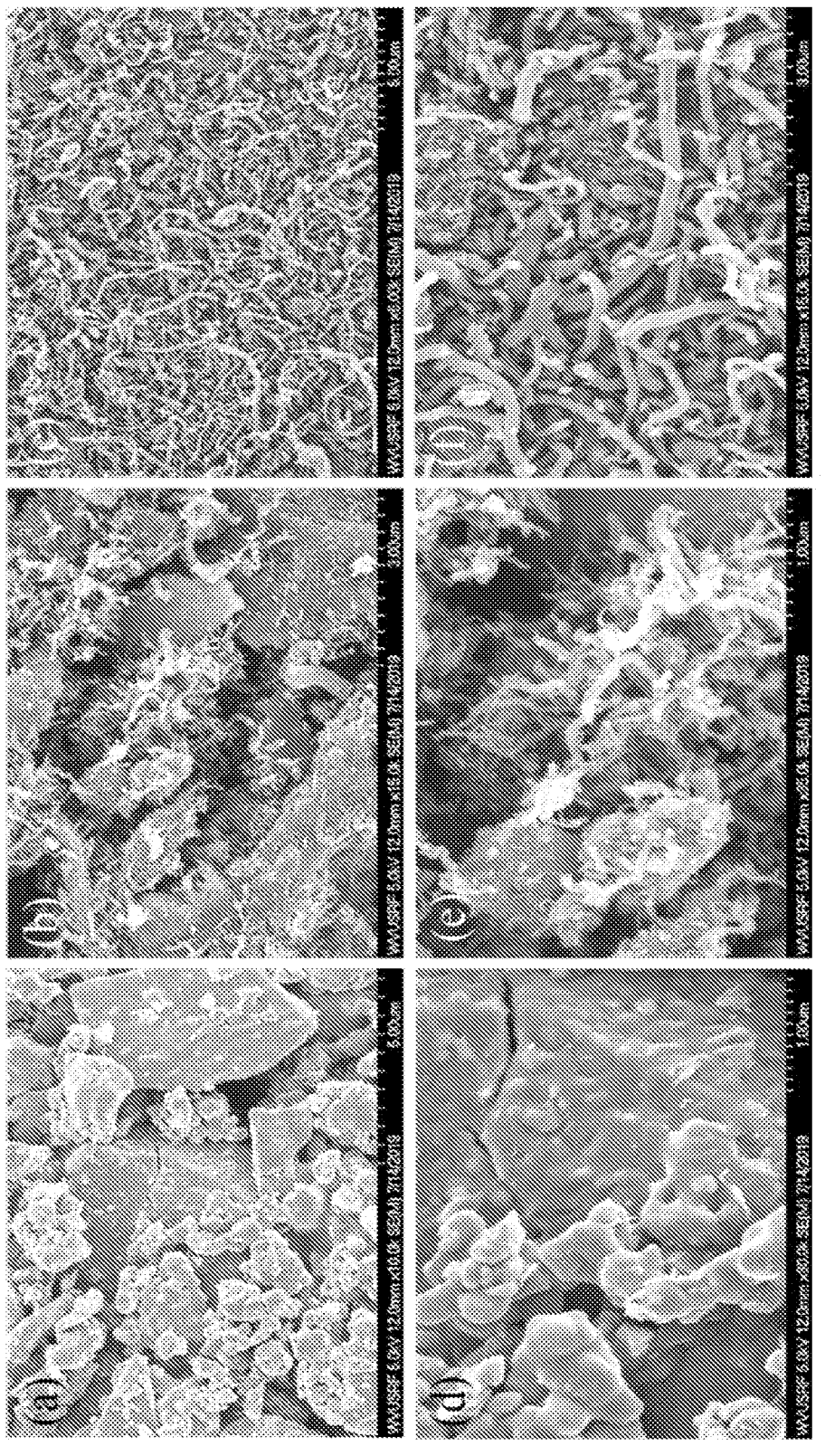
FIG. 15 shows SEM images of unsupported catalysts after reaction: (a) and (d) Ni, (b) and (e) 15 Ni-1 Pd, and (c) and (f) 10 Ni-1 Pd.

SEM images of unsupported catalysts are shown in FIG. 15. No evidence of growing CNT or CNF was observed on the unsupported Ni catalysts; this result is consistent with the TEM analysis, which shows coke formation on the metal surface (FIG. 15). However, SEM images of unsupported 10 Ni-1 Pd and 15 Ni-1 Pd reveal growing CNFs. Some agglomerated particles were observed on the 15 Ni-1 Pd catalyst, on which CNFs were not observed. The agglomerated particles were not found on the 10 Ni-1 Pd catalyst. Thus, low loading of Pd can affect particle size, catalytic activity, and the structure of growing carbon nanomaterials.

Thermogravimetric Analysis

Figures 16A, 16B, 16C, 16D:
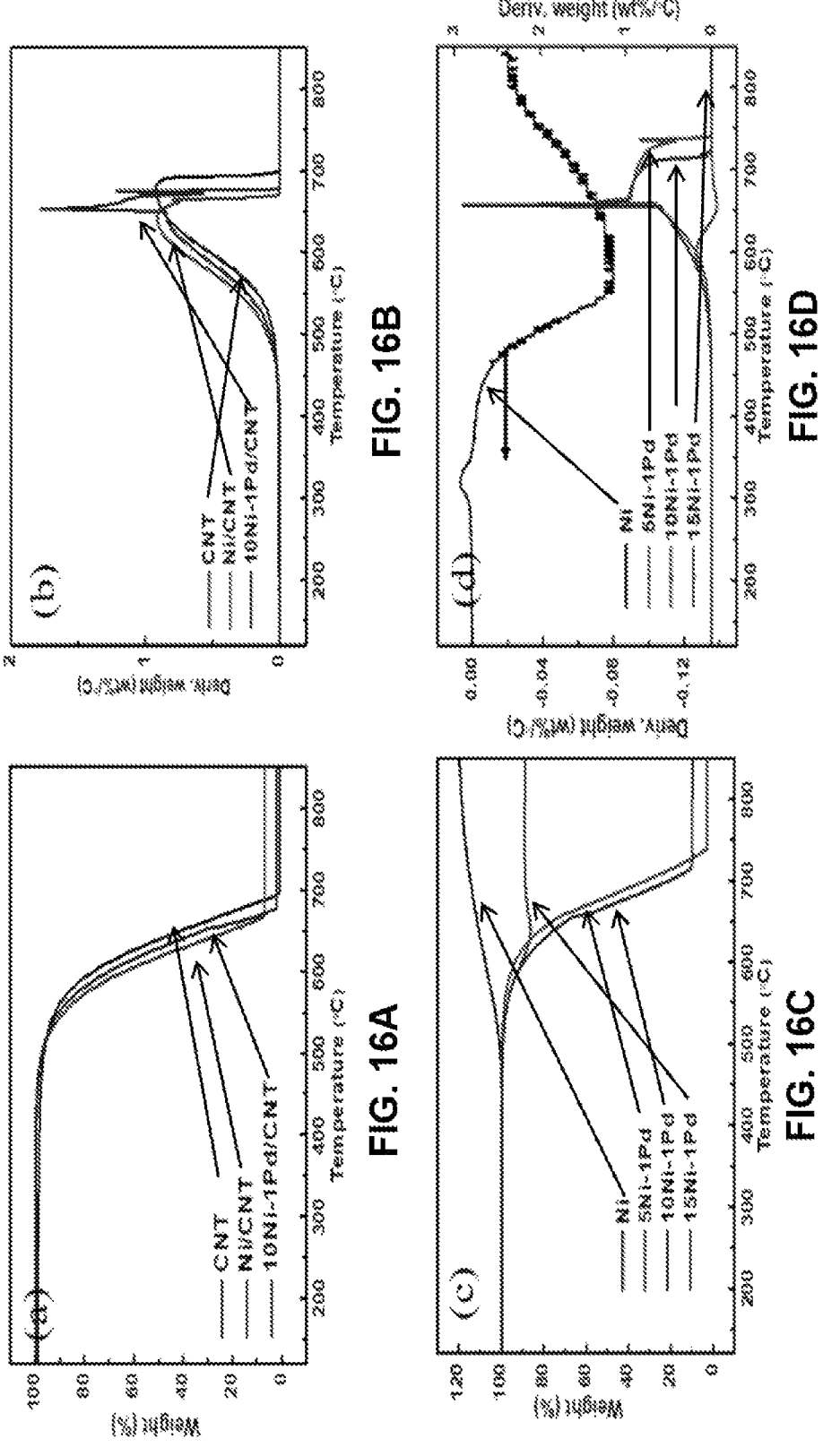
FIG. 16 shows thermogravimetric analysis (TGA) and derivative (DTG) profiles of spent catalysts showing (a) weight loss of pristine CNT and spent CNT support catalyst, (b) differential plots of curves in panel (a), (c) weight loss of unsupported Ni, 5 Ni-1 Pd, 10 Ni-1 Pd, and 15 Ni-1 Pd, and (d) differential plots of curves in panel (c).

Spent catalysts were characterized using thermogravimetric analysis (TGA/DTG). Based on oxidation temperature, TGA/DTG can reveal crystalline carbon with high-range order and amorphous carbon with short-range order. Results indicate that the initial temperature of carbon oxidation decomposition is higher than 400° C., implying the presence of higher degree crystalline carbon structure. For pristine CNT and supported 10 Ni-1 Pd/CNT and Ni/CNT, the initial decomposition temperature is above 450° C., implying the presence of crystalline structure (FIG. 16). For unsupported 10 Ni-1 Pd, 5 Ni-1 Pd, and 15 Ni-1 Pd, weight loss occurs above 450° C. (FIG. 16). For the unsupported Ni catalyst, a slight weight loss between 300 and 400° C. was observed to amorphous coke formation. SEM analysis is consistent with results from TEM. Weight gain at temperatures above 400° C. is due to the oxidation of Ni metal.

Example 7: DFT Modeling

Based on the results described above, the excellent activity of Ni—Pd/CNT can be ascribed to the combined effects of the following: (1) the CNT support improves the metal dispersion, (2) the presence of Pd leads to resistance to coking, (3) the formation of CNTs or CNFs could allow catalysts to maintain their activity and stability for a long run without deactivation.

DFT Method

Plane wave DFT code as implemented in the Vienna ab initio simulation package (VASP version 5.3.5, University of Vienna, Austria) was used to calculate the adsorption energies of intermediates. Core electrons were described using Vanderbilt ultrasoft pseudopotentials. Kohn Sham one electron valence states were expanded with the plane wave basis function and truncated at a cut-off energy of 396 eV. Revised Perdew-Burke-Ernzerhof (RPBE) exchange correlation function was used to describe the exchange and correlation contributions for a single electron equation.

Figure 21:
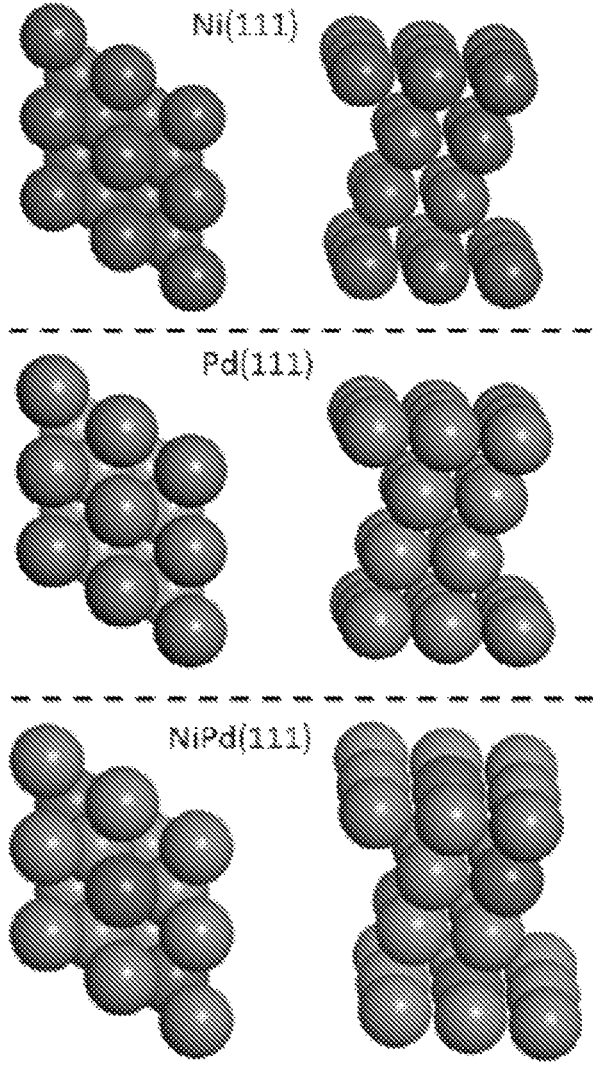
FIG. 21 shows DFT optimized structures of Ni(111), Pd(111) and Ni$_3$Pd(111) catalyst model surfaces.

The bimetallic NiPd alloy was modeled using $Ni_3Pd$ with FCC crystal geometry. Lattice optimization of the Ni3Pd crystal was performed to get the correct lattice parameter a=b=c=3.71 Å, α=90°. Terrace (111) surface of Ni, Pd, and $Ni_3Pd$ was modeled using a slab of 4 layers of size 4×4. The bottom two layers of the surface were fixed while the upper half along the adsorbates was allowed to relax (FIG. 21). Slabs were periodically repeated with 20 Å vacuum between the slabs to distinctly represent gas phase adsorption to the surface. A Monkhorst-Pack k point grid with 3×3×1 mesh was used to sample the irreducible Brillouin zone. Convergence criteria for force and energy were set to 0.05 eV/A and $10^{-4}$ eV, respectively. All calculations performed for Ni(111) and $Ni_3Pd(111)$ surfaces were spin-polarized. A Methfessel-Paxton smearing parameter of 0.2 was used for all calculations.

Microkinetic Modeling

An ab initio microkinetic model (MKM) for $CH_4$ decomposition was designed for the (111) surface of transition metals Ag, Cu, Pd, Pt, Ni, Rh, and Ru using the descriptor based analysis platform in CatMAP (Stanford University, CA, USA).

In CatMAP, a multidimensional Newton's root finding method from the python mpmath library was implemented to obtain steady-state solutions of the governing differential equations. The elementary steps involved are listed below:

R1: $CH_4(g)+2^* \rightarrow CH_3^*+H^*$
R2: $CH_3^*+ \rightarrow CH_2^*+H^*$
R3: $CH_2^*+ \rightarrow CH^*+H^*$
R4: $CH^*+H^*C^*+H^*$
R5: $C^*+C^* \rightarrow C_2^*+^*$
R6: $H^*+H^*H_2(g)+2^*$
R6: $3\ C_2^* \rightarrow C_6(g)+3^*$ Energies of the adsorbed species, transition states over transition metal surfaces used in the kinetic model, were obtained from the CatAPP database. These energies were calculated using similar plane wave DFT calculations with a Revised Perdew-Burke-Ernzerhof (RBPE) Generalized Gradient Approximation (GGA) exchange correlation function. Energies of the intermediates and transition states were referenced to the gas phase energies of hydrogen, water, and methane using the following formula:

$$ECxHy = Eslab + CxHy - Eslab - [(ECH4 - 2EH2) + y/2EH2]$$

where $E_{slab+CxHy}$, $E_{slab}$, $E_{CH4}$, and $E_{H2}$ are the energies of adsorbed intermediate, clean surface, methane, and hydrogen, respectively. The energy of C6 is obtained from the ΔH of the reaction:

$$CH_4 \rightarrow C+2H_2(g)(\Delta H=-72.6\ kJ/mol)$$

Fixed entropy assumption for gas-phase species was applied. Zero point energies (ZPE) of the gas phase species were calculated using the normal mode vibrational frequency analysis with harmonic approximation.

Frozen adsorbate approximation was used for the adsorbates, assuming negligible entropy changes in the reactions taking place on the surface. Two different sites were used for adsorption in the model—one for all the adsorbates and the other for hydrogen, since the hydrogen molecule, being small in size, was unlikely to compete with the other adsorbates. The model considered the number of hydrogen sites to be equal to the terrace sites. In order to simulate reactor operational conditions, the solutions for the MKM were obtained for reaction conditions at temperature 600° C. and pressure 1 bar, with 0.01% conversion of methane.

Figure 18:
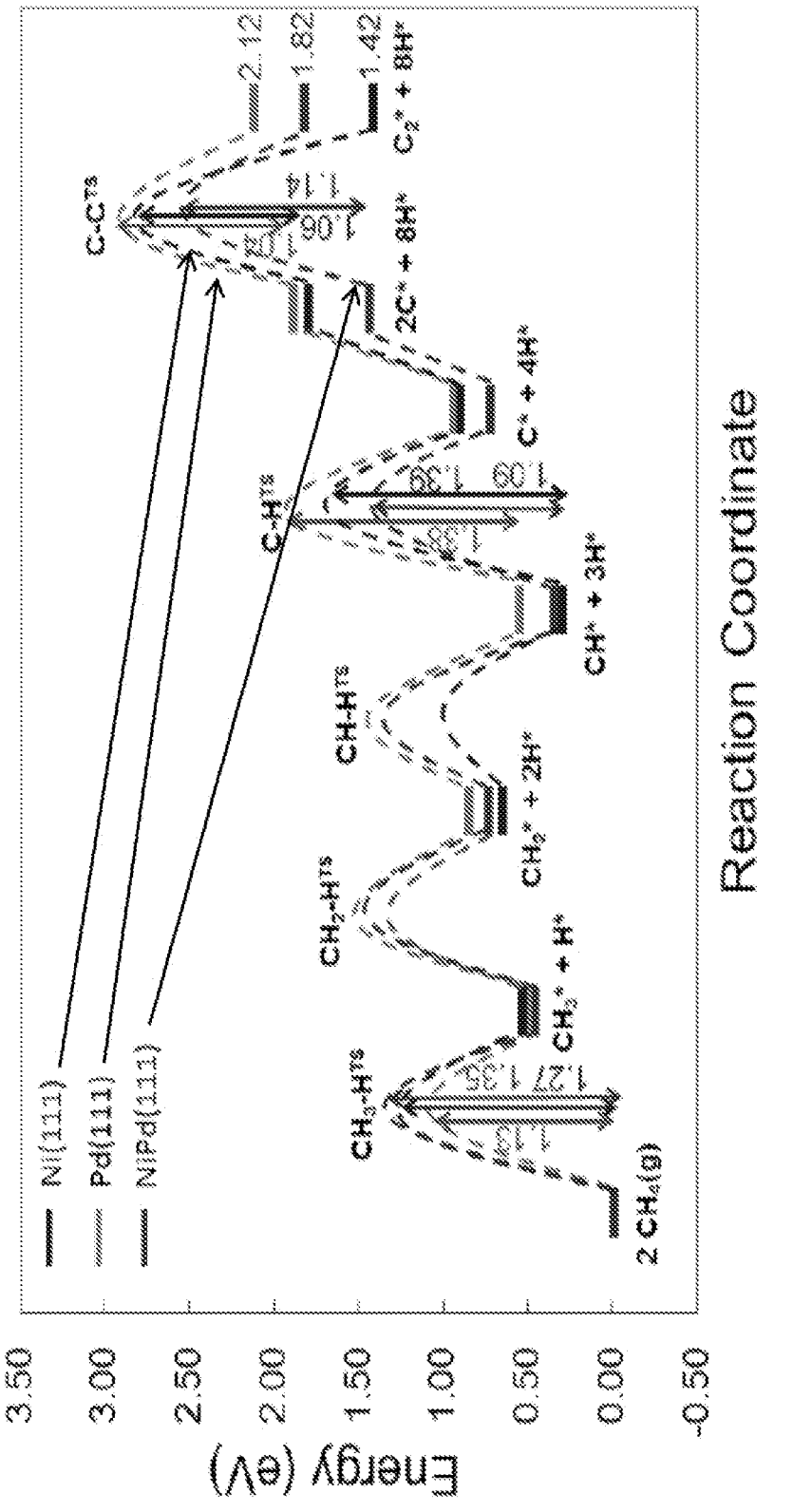
FIG. 18 shows a potential energy diagram for methane cracking and $C_2$ formation over Ni(111), Pd(111), and Ni$_3$Pd (111) surfaces.

To understand the differences between initial conversion and lifetime of Ni, Pd, and Ni—Pd catalysts, dissociation of $CH_4$ and C—C bonding formation versus C dissolution were studied using density functional theory (DFT) modeling. A potential energy diagram obtained for the Ni, Pd, and $Ni_3Pd(111)$ surfaces is shown in FIG. 18.

The initial conversion is associated with the activation energy barrier of breaking four C—H bonds of methane. All three catalyst surfaces have similar energy profiles with similar activation barriers for C—H bond dissociation and the C—C coupling reaction. The activation barrier (Eact) for the first C—H bond activation for Ni(111) and Pd(111) was calculated to be 1.27 eV and 1.13 eV, respectively, whereas the barrier at the $Ni_3Pd$ surface was somewhat higher at 1.35 eV. Conversely, the activation barrier for C—H bond dissociation of the adsorbed CH intermediate was calculated to be higher for Ni(111) and Pd(111), at 1.39 eV and 1.38 eV, respectively, compared to 1.09 eV observed over the $Ni_3Pd$ (111) surface. The highest activation barriers calculated for C—H bond dissociation over Ni(111), Pd(111), and $Ni_3Pd$ (111) were all of similar value at 1.39 eV, 1.38 eV, and 1.35 eV, respectively. The activation energies for the C—C coupling reaction over all three surfaces were also similar at 1.05 eV for Ni(111), 1.04 eV for Pd(111), and 1.14 eV for $Ni_3Pd(111)$. However, the formation of C2 species was more favorable over the Ni(111) surface (1.42 eV for $C_2+8H$), compared to the Pd(111) and $Ni_3Pd(111)$ surfaces, at 2.12 eV and 1.82 eV, respectively, for $C_2+8H$ (FIG. 18).

Figure 19:
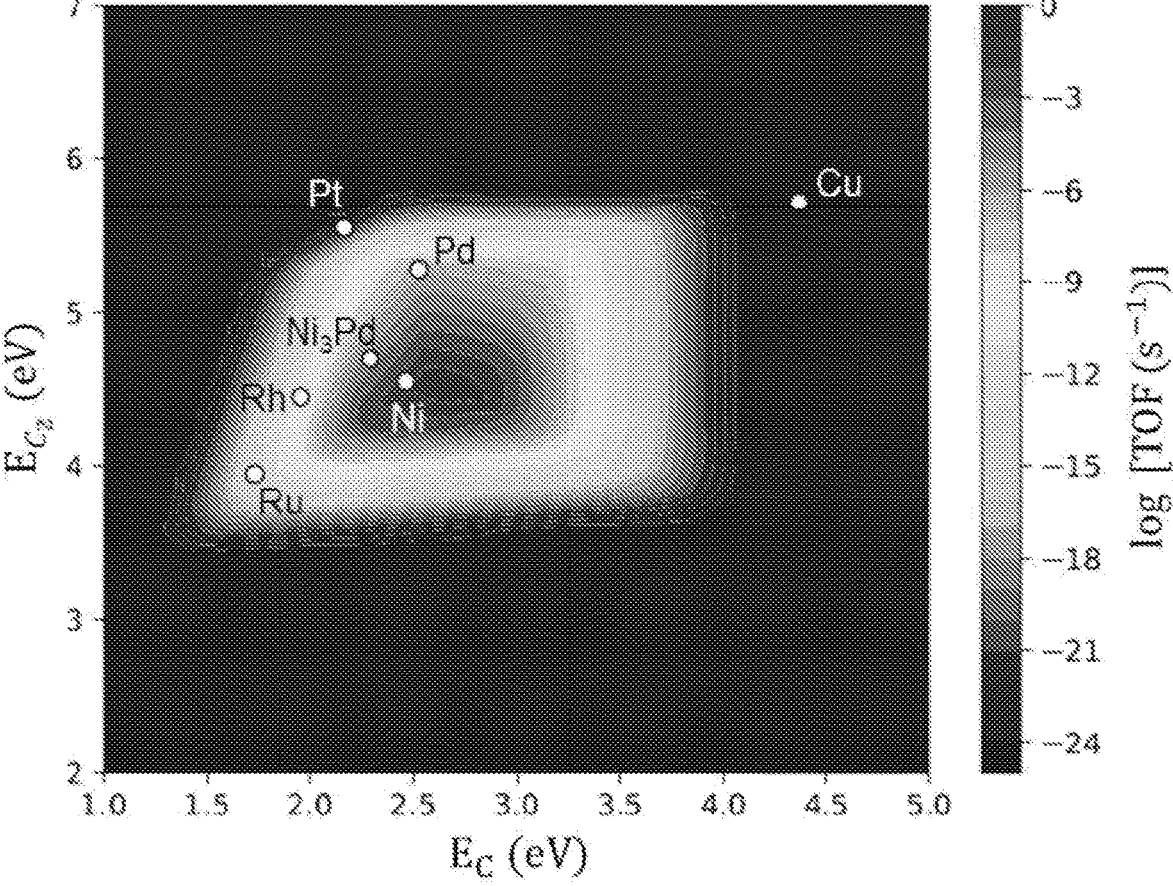
FIG. 19 shows a rate volcano plot for CH4 conversion over transition metal surfaces. Reaction conditions: temperature 600° C., pressure 1 bar, 0.01% conversion.

To calculate the trends in the initial rate of Ch$ decomposition over the transition metal surfaces, CatMAP (Stanford University, CA, USA) software was used. A rate volcano plot obtained for the $CH_4$ dissociation for pure transition metals and the $Ni_3Pd$ bimetallic alloy is shown in FIG. 19.

Among the transition metals, Ni was calculated to be the most active with a turnover frequency (TOF) of about 0.1 $s^{-1}$, followed by $Ni_3Pd$ (TOF~$10^{-4}$ $s^{-1}$) and Pd (TOF~$10^{-6}$ $s^{-1}$), which matches the experimentally observed trend for the initial methane conversion where NiCNT>10Ni–1PD/CNT>Pd/CNT. The overall catalytic activity trend for methane conversion over transition metal surfaces was Ni>Ni3Pd>Pd>Rh>Ru>Cu.

Stability

Figure 20:
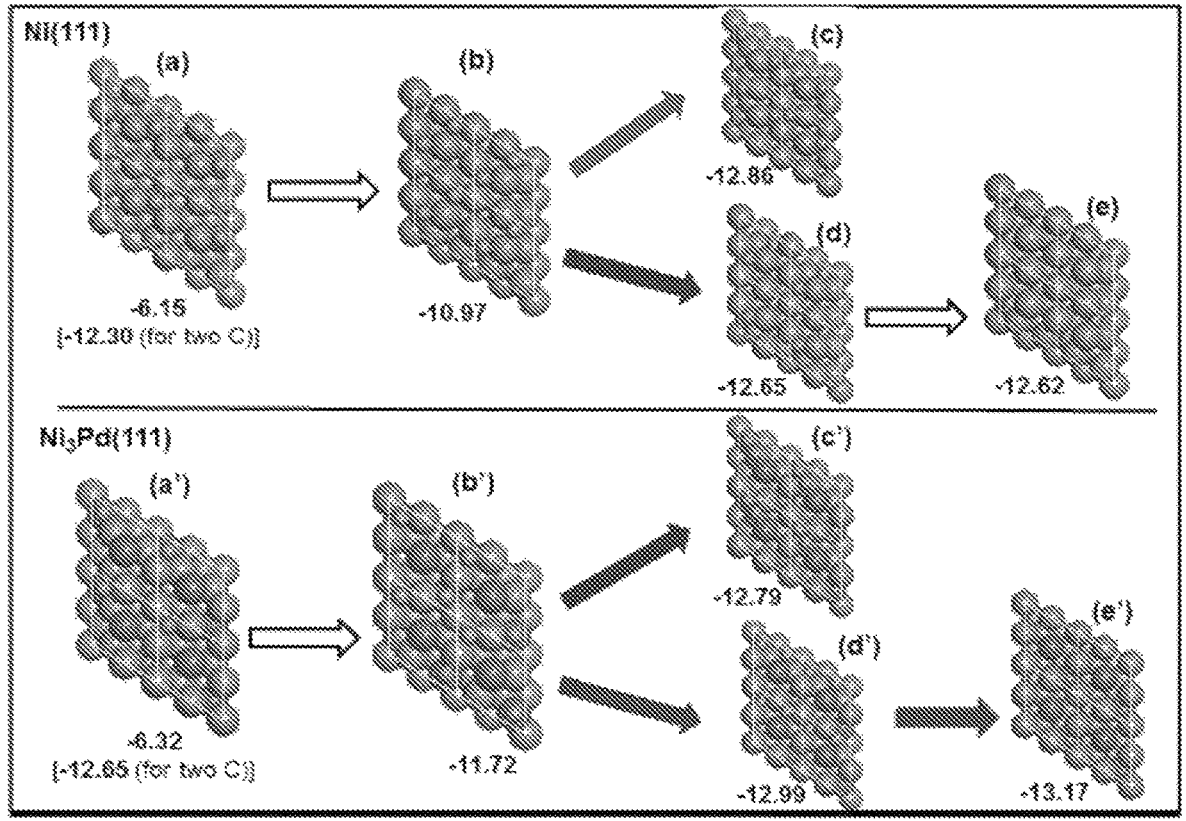
FIG. 20 shows DFT calculated energies for the competing routes for $C_2$ formation versus the dissolution of carbon over Ni(111) (top) and Ni$_3$Pd(111) (bottom) surfaces. The favorable routes are marked with green arrows. Adsorption energies are given below the geometries in eV.

Though Ni/CNT shows the highest initial methane conversion, this catalyst deactivates very quickly due to coke formation, whereas both Pd/CNT and $Ni_3PD/CNT$ show stable conversion of methane for at least 6 hours. To understand the higher stability of $Ni_3Pd$ towards coke formation compared to Ni, DFT modeling was again employed. Carbon atoms decomposed from methane molecules on the catalyst surface can either form as CNTs/CNFs or cover the metal active site and impede further dissociation of methane molecules, thereby deactivating the catalysts. To evaluate these two competing phenomena, formation of carbon dimer ($C_2$, known as the precursor for graphite coking) and dissolution of carbon atoms on the sublayer on the (111) surfaces, where these carbon atoms are proposed to act as the carbon reservoir during CNT/CNF formation, were studied over both the Ni(111) and $Ni_3Pd(111)$ surfaces as shown in FIG. 20. Adsorption energy (Eads) is defined as follows:

$$E_{ads}=E_{slab+Cx}-E_{slab}\times E_c(g)$$

where $E_{slab+Cx}$, $E_{slab}$, and $E_c(g)$ are the total energies of species adsorbed on the surface, clean surface, and gasphase energy of C atoms.

Without wishing to be bound by theory, formation of coke on the particle surface blocks the catalyst active sites and reduces catalyst lifetime. However, if carbon atoms can diffuse into the sublayers of the metal particles, it can inhibit the formation of graphite coking on the particle surface and promote the growth of CNTs/CNFs. This dissolution of carbon also frees the active sites for further methane conversion and maintains the stability of the catalysts.

As seen in FIG. 20, the carbon atoms bind strongly to both the Ni(111) and $Ni_3Pd(111)$ surfaces with adsorption energies of −6.15 eV and −6.32 eV (see also FIGS. 20 (a) and (a')), respectively. At higher coverage (0.5 ML), the adsorption energy of two carbons over Ni(111) and Ni3Pd(111) are calculated to be −10.97 eV and −11.72 eV (see also FIGS. 20 (b) and (b')), respectively. The lowering of adsorption energy per carbon atom at higher coverage is due to the repulsive adsorbate-adsorbate interaction. These two carbons adsorbed at the surface can either undergo a C—C coupling to form a $C_2$ species (see also FIGS. 20 (c) and (c')), or they can diffuse to the sub-layer of the metal surface (see also FIGS. 20 (d-e) and (d'-e') for Ni(111) and $Ni_3Pd$ (111) surfaces, respectively). As can be seen for the energies in FIG. 20, the formation of C2 is favorable over the Ni(111) surface, whereas over the $Ni_3Pd(111)$ surface, the dissolution of carbon to the sub-layer was found to be the favorable route. Without wishing to be bound by theory, the favorable dissolution of carbon compared to C2 formation can be attributed to the high stability of $Ni_3Pd$ during the reaction. The dissolved carbon atoms sitting at the sub-layers thus work as reservoirs for carbon during CNT/CNF growth.

Although structure or particle size is an important parameter affecting the production of $H_2$ and the growth of CNTs/CNFs, methane decomposition is a kinetically-controlled process. Reaction pathways include: (1) C—H bond dissociation, (2) carbon diffusion through the catalyst surface, and (3) carbon assembly to 3D structure for CNTs and CNFs.

Whether carbon is formed as graphitic carbon layers from coking (2D) or a structure like CNTs or CNFs (3D) depends on reaction kinetics. If diffusion is faster than carbon assembly, the coking reaction becomes dominant. Even if small particles tend to deactivate by coking while large particles favor the formation of 3D carbon, the effect of particle size on the conversion is still active with respect to methane decomposition.

Characterization of spent Ni/CNT and spent 10 Ni-1 Pd/CNT was carried out by TEM. Results showed that the particle sizes of the two catalysts were larger than 10 nm, but Ni/CNT did not have good stability due to coking.

To clarify whether CNT/CNF formation and growth are kinetically controlled by the three steps of methane decomposition, change of methane conversion over the 10 Ni-1 Pd/CNT catalyst with cyclic temperature variations was monitored. At higher temperatures of 650° C., the conversion dramatically decreased over time due to coke formation covering metal particles. Assuming the process is kinetically controlled for all three steps (i.e., none of the steps were under equilibrium), methane conversion would be resumed if the temperature was lowered to 600° C., largely because at higher temperatures, the first two steps as described above proceed faster than carbon assembly, producing excessive carbon and exceeding the ability of the catalyst to assemble the carbon. As the temperature is lowered to 600° C., the first two reactions slow down, allowing the third step to continue to process carbon to form CNT/CN F.

Figure 17:
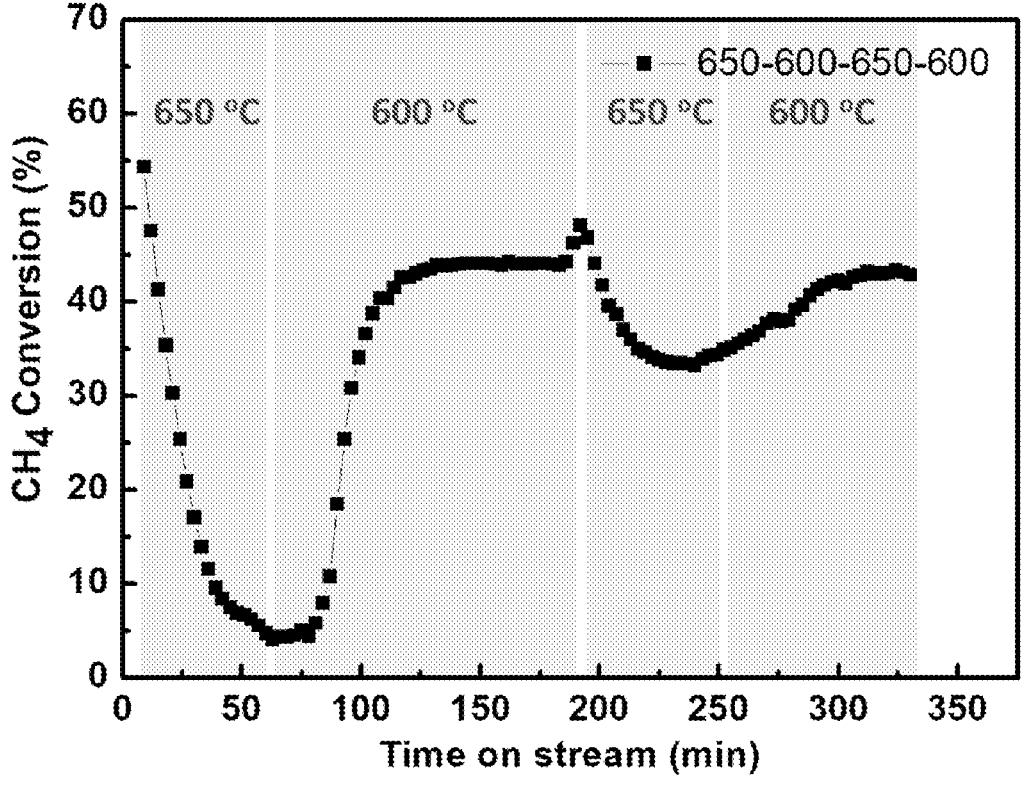
FIG. 17 shows hysteretic behavior of 10 Ni-1 Pd/CNT between 600° C. and 650° C.

As expected, when temperature is reduced to 600° C., methane conversion was restored (FIG. 17). Repeated cycles of temperature changes caused cyclic behavior. These results suggest that methane decomposition is a kinetic-controlled process while particle size and structure sensitivity have strong impacts on the three kinetically-controlled steps.

Figure 22:
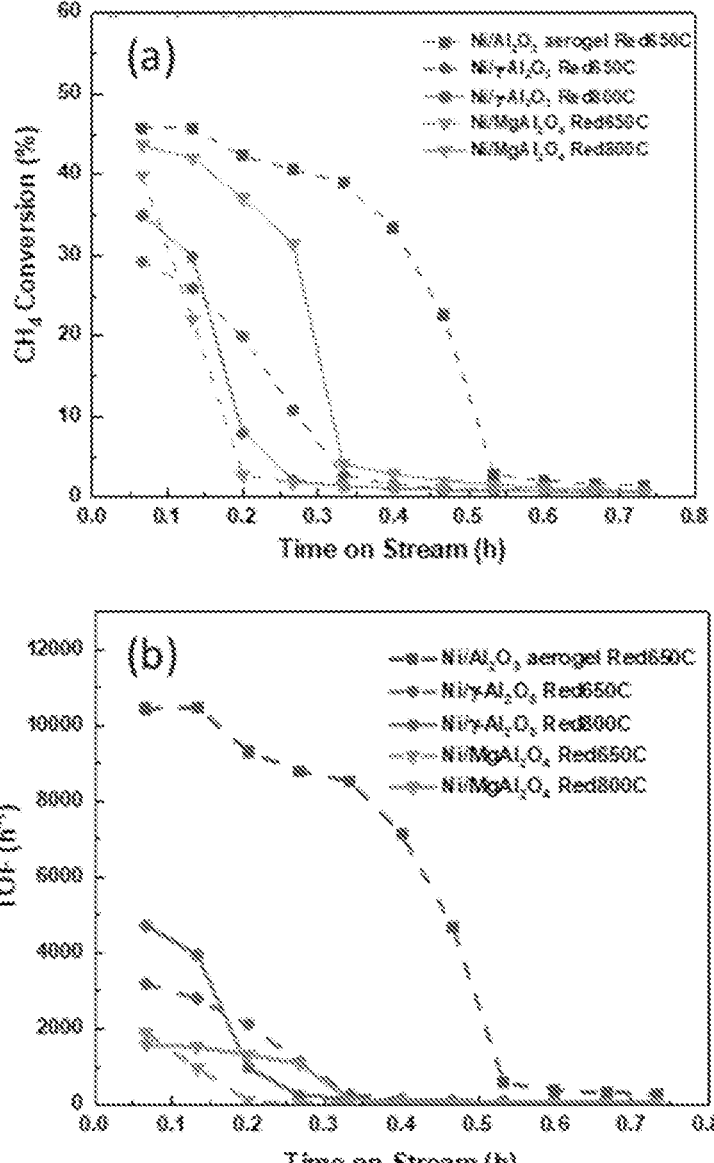
FIG. 22 shows (a) conversion and (b) turnover frequency (TOF) for the methane pyrolysis reaction as a function of time-on-stream for the series of catalysts with varied Ni particle sizes supported on Al$_2$O$_3$ or MgAl$_2$O$_4$ as depicted in Table 1 (650° C., 1 atm, 14,000 hr$^{-1}$; feed=30 vol % CH$_4$/N$_2$).
Figure 23:
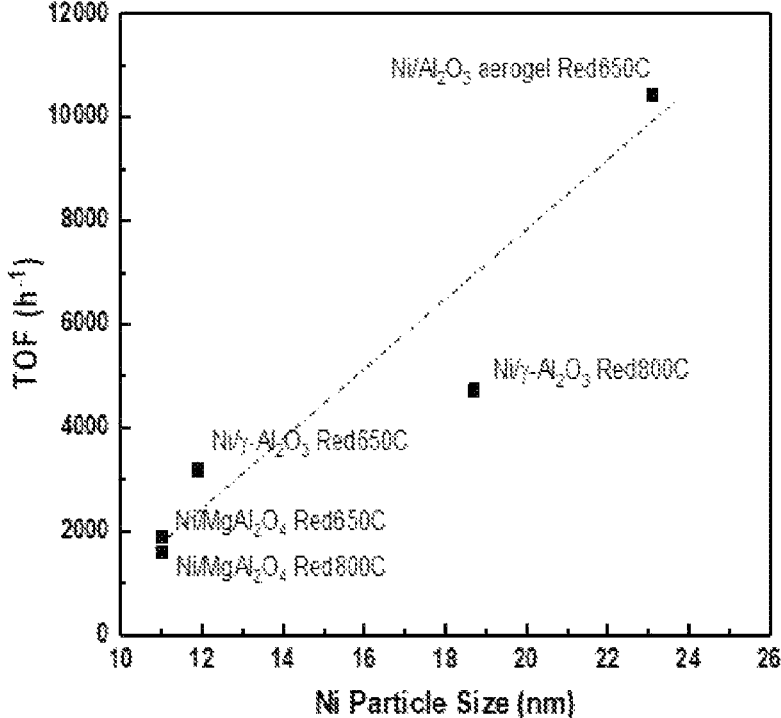
FIG. 23 shows turnover frequency (TOF) as a function of Ni particle size, for the series of catalysts shown in Table 1, with varied Ni particle sizes (650° C., 1 atm, 14,000 hr$^{-1}$; feed=30 vol % CH$_4$/N$_2$). Ni particle size was determined from XRD. Methane turnover frequency (TOF) was calculated using the activity data presented in FIG. 22 at 4 minutes time-on-stream. H$_2$ pulse chemisorption was used to determine the number of active sites (see Table 1).

Example 8: Influence of Nickel Particle Size on Activity and Carbon Product Selectivity The influence of Ni particle size was investigated for the methane pyrolysis reaction. A series of five Ni-based catalysts with a range of Ni particle sizes were prepared by varying support material (i.e., $Al_2O_3$ and $MgAl_2O_4$), method of synthesis (i.e., incipient wetness and sol gel), and reduction temperature (i.e., 600° C. and 850° C.). Although prepared from the same support, Ni/$Al_2O_3$ aerogel and Ni/$\gamma$-$Al_2O_3$ catalysts exhibited very different surface areas and Ni particle sizes due to the synthesis methods employed. Among the catalysts studied, Ni/$Al_2O_3$ aerogel showed the highest surface area of 278 $m^2$/g. The Ni/$\gamma$-$Al_2O_3$ and Ni/$MgAl_2O_4$ catalysts showed similar surface areas, between 90 and 116 $m^2$/g. Catalysts with varied Ni particle sizes were also produced. $H_2$ pulse chemisorption and XRD techniques were used to characterize Ni particle size, and XRD was used to confirm identify of the support phase (as either $Al_2O_3$ or $MgAl_2O_4$). Physiochemical properties for the resulting catalysts are shown in Table 1.

methane pyrolysis conditions at 650° C. In order to normalize activity on a per active site basis, the methane turnover frequency (TOF) is shown in FIG. 22 (b), also as a function of time-on-stream. The Ni/$Al_2O_3$ aerogel catalyst exhibited both the highest $CH_4$ conversion and turnover, and the longest catalyst lifetime. Ni/$\gamma$-$Al_2O_3$ and Ni/$MgAl_2O_4$ showed lower $CH_4$ conversions and were faster to completely deactivate than the Ni/$Al_2O_3$ aerogel formulation. However, the deactivation rates, were similar for all the catalysts evaluated. The high conversion over Ni/$Al_2O_3$ aerogel is attributed to its large Ni particle size, relative to the other catalysts investigated. Shown in FIG. 23 is the initial TOF (at 4 minutes time-on-stream) as a function of Ni particle size. Here, a clear trend can be observed; methane turnover increases with increasing Ni particle size. Further, these findings also suggest that the corresponding TOF increase is independent of the choice of catalyst support.

Figure 24:
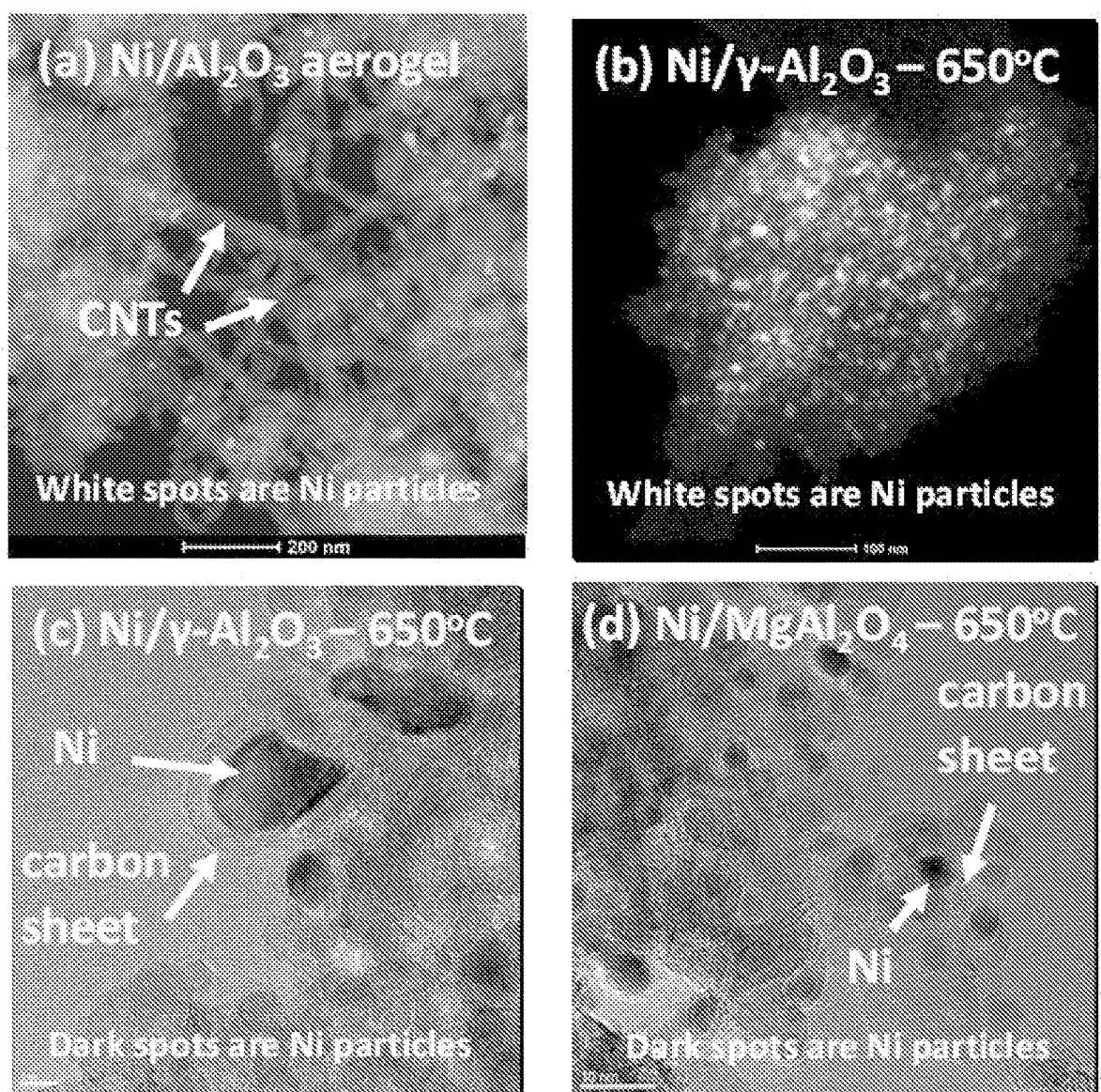
FIG. 24 shows HRTEM images for the spent catalysts after reaction for the (a) Ni/Al$_2$O$_3$ aerogel, (b-c) Ni/γ-Al$_2$O$_3$—650° C., and (d) Ni/MgAl$_2$O$_4$—650° C. catalysts (from FIG. 22).

High resolution transmission electron microscopy (HR-TEM) was used to study the morphologies of the spent catalysts after reaction (see FIG. 24). Ni/$Al_2O_3$ aerogel was found to have the largest Ni particle sizes for the series investigated, thus confirming XRD and $H_2$ chemisorption results. As shown in FIG. 24 (a) numerous CNTs were observed. Most of CNTs are present with Ni particles in the range of 20-50 nm. By comparison, much smaller Ni particles are observed with the Ni/$\gamma$-$Al_2O_3$ catalyst, as illustrated in FIG. 24 (b-c). Here, images reveal the formation of graphitic carbon layers. Ni particles were covered by carbon sheets. A few CNTs are detected, however, with significantly less frequency relative to the Ni/$Al_2O_3$ aerogel catalyst. Nickel particles are found to be much smaller than 20 nm. Similar observations were found with the Ni/$MgAl_2O_4$ catalyst, shown in FIG. 24 (d). Smaller nickel particles tend to result in the formation of graphitic carbon layers, while larger particles prefer the formation of CNTs. Combining catalytic activity results and HRTEM images for the spent catalysts, we have determined that larger Ni particle sizes promote CNT and carbon fiber growth, while smaller Ni particles favor the formation of layered graphitic sheets that more quickly encapsulate the catalytic active sites. Larger Ni

TABLE 1

| | Ni Loading[a] (wt. %) | Support[b] | Surface Area[c] ($m^2$/g) | $H_2$ Uptakes[d] ($\mu$mol/g) | $Ni^{(0)}$ Particle Size[d] (nm) - $H_2$ Chemisorption | $Ni^{(0)}$ Particle Size[e] (nm) - XRD |
|---|---|---|---|---|---|---|
| Physiochemical Properties of Catalyst Compositions | | | | | | |
| Catalyst | | | | | | |
| Ni/$Al_2O_3$ aerogel | 8.6 | $\gamma$-$Al_2O_3$ | 278 | 4.27 | 194 | 23.1 |
| Ni/$\gamma$-$Al_2O_3$- 850° C. Reduction | 10.1 | $\gamma$-$Al_2O_3$ | 96 | 6.76 | 122 | 18.7 |
| Ni/$\gamma$-$Al_2O_3$- 650° C. Reduction | 10.1 | $\gamma$-$Al_2O_3$ | 116 | 8.06 | 103 | 11.9 |
| Ni/$MgAl_2O_4$- 650° C. Reduction | 9.8 | $MgAl_2O_4$ | 107 | 19.82 | 42 | 11.0 |
| Ni/$MgAl_2O_4$- 850° C. Reduction | 9.8 | $MgAl_2O_4$ | 90 | 26.41 | 31 | 11.0 |

[a]ICP,
[b]XRD,
[c]BET,
[d]$H_2$ pulse chemisorption (assume H/Ni = 1 mol),
[e]XRD.

This series of catalysts were evaluated for the methane pyrolysis reaction. Shown in FIG. 22 (a) is methane conversion as a function of time-on-stream when operated under particles favor the growth of longer carbon chains, comprising nanotubes and fibers, thus producing more moles of solid carbon product per mole of Ni available. Taken together, larger Ni particles (>20 nm) facilitate the production of more crystalline product, while generating a highly crystalline carbon product that is more selective to nanotubes and fibers. By contrast, graphitic layers or sheets are predominantly formed with the use of smaller Ni particles (<20 nm).

Example 8: Effect of Process Variables on Catalytic Activity

Monometallic and bimetallic catalysts comprising a total metal loading of 11 wt % on CNT (X of Ni:1Cu) were prepared via a solvothermal method. The weight ratio of metal is designed as X of Ni:1 Cu for supported and unsupported catalysts. The desired amount of precursors of $Ni(NO_3)_2 \cdot 6H_2O$ and $Cu(NO_3)_2 \cdot 3H_2O$ were dissolved in 50 ml acetone solvent under agitation for 1 hr and sonicated for 25 minutes before CNT was added into the solution. The solution was continuously stirred for 3 hours and subsequently sonicated for 30 minutes. The resulting heterogeneous solution was transferred into a Teflon-lined stainless-steel autoclave (100 ml), sealed and heated to 120° C. for 12 hours. After the autoclave was cooled down to room temperature, the solution from autoclave was placed inside a fume hood to evaporate acetone solution at room temperature and subsequently dried overnight at 80° C. until completely dry. Dry solids were ground into fine powders, reduced at 400° C. for 4 hours in a tube furnace using 10 mol % $H_2$ in $N_2$ at 50-70 SCCM, and stored in a vacuum desiccator. The unsupported catalysts were prepared following the same protocol.

Figure 25:
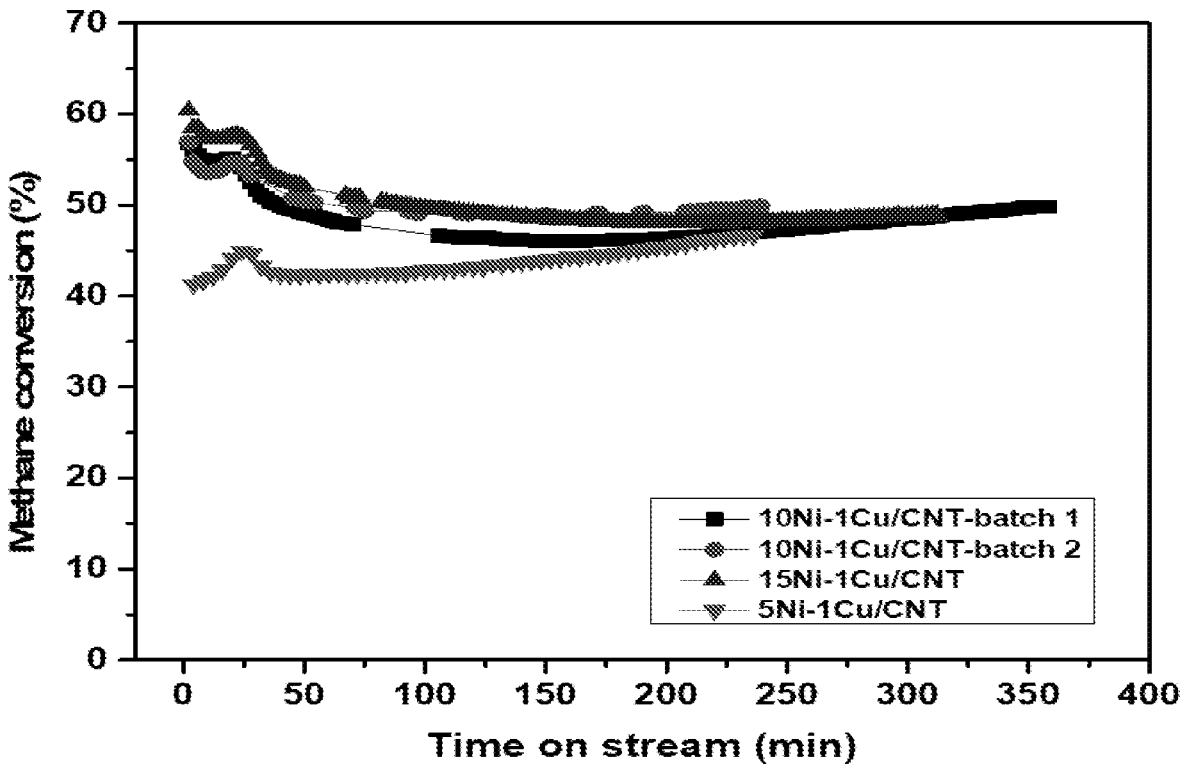
FIG. 25 shows representative data for conversion of Ni—Cu-CNT catalysts for the catalytic methane decomposition at 600° C. and 30% CH$_4$/70% N$_2$ gas stream (30 sccm).

As shown in FIG. 25, the exemplary Ni—Cu-CNT catalysts show stable performance in catalytic methane decomposition when comparing the conversion of different Ni/Cu ratio including 10Ni-1Cu/CNT made from duplicated batch 1 and batch 2. A higher Cu/Ni ratio (5Ni-1Cu/CNT) led to a somewhat lower conversion rate. Without wishing to be bound by a particular theory, this may be because Cu was not as active as Ni in methane decomposition. In contrast, lower Cu/Ni ratio catalysts, e.g. 10Ni-1Pd/CNT and 15Ni-1Pd/CNT, showed similar but very efficient and stable performance with no trend of catalyst degradation is observed.

Figure 26B:
FIGS. 26A-26B show representative transmission electron micrographs of spent 10Ni-1Cu/CNT.
Figure 26A:
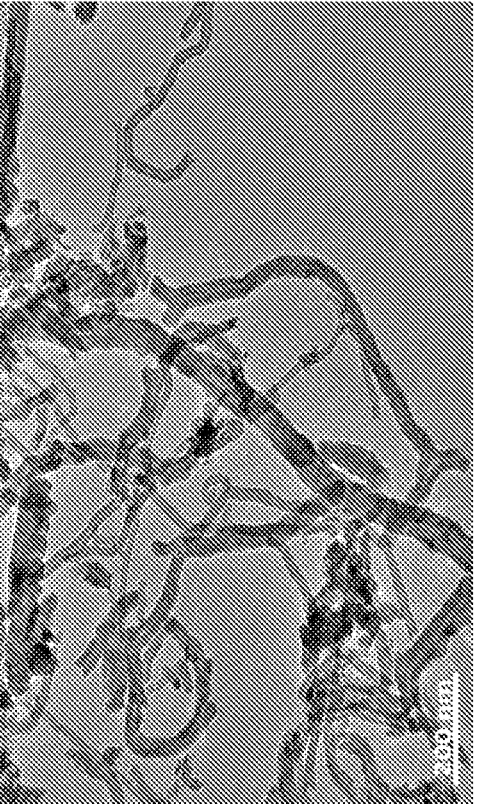

Transmission electron micrograph images of spent 10Ni-1Cu/CNT are shown in FIGS. 26A-26B. The images show a carbon product consisting of carbon nano fiber (CNF) with the fiber diameter ranging from 10 nm to 60 nm. These data indicate the capability of Ni—Cu-CNT catalysts to produce a valuable carbon product in a relatively large range of catalyst particle size. In addition, the length of some fibers is fairly long, supporting robust effectiveness of the disclosed catalyst system in which CNF is constantly produced.

Figure 27:
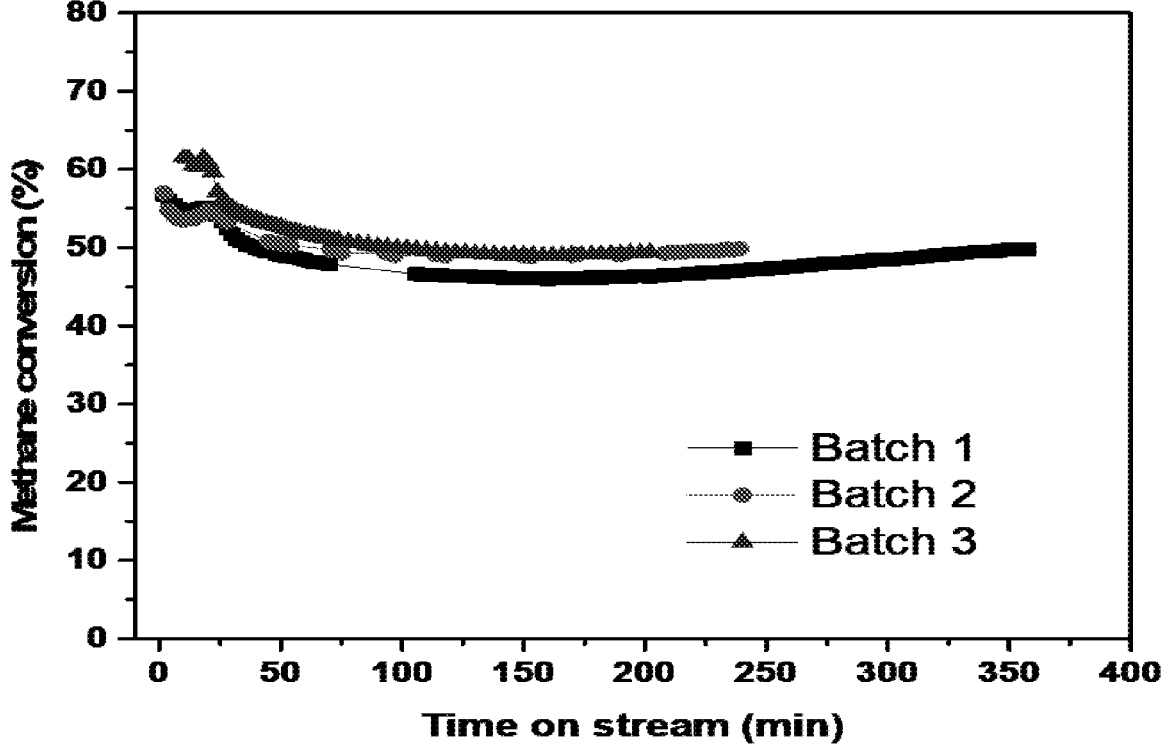
FIG. 27 shows representative data demonstrating the reproducibility of the Ni—Cu-CNT catalysts.

Data in FIG. 27 show the reproducibility of the disclosed Ni—Cu-CNT catalysts and that both the synthesis and testing methods are highly reproducible as evidenced by the small activity differences between each batch of catalysts. The data in FIG. 27 show that there is only 1-2% difference between batch 1 and batch 2; and the conversion curves of batch 2 and 3 are nearly overlapped, and these differences are well within experimental error.

Figure 28:
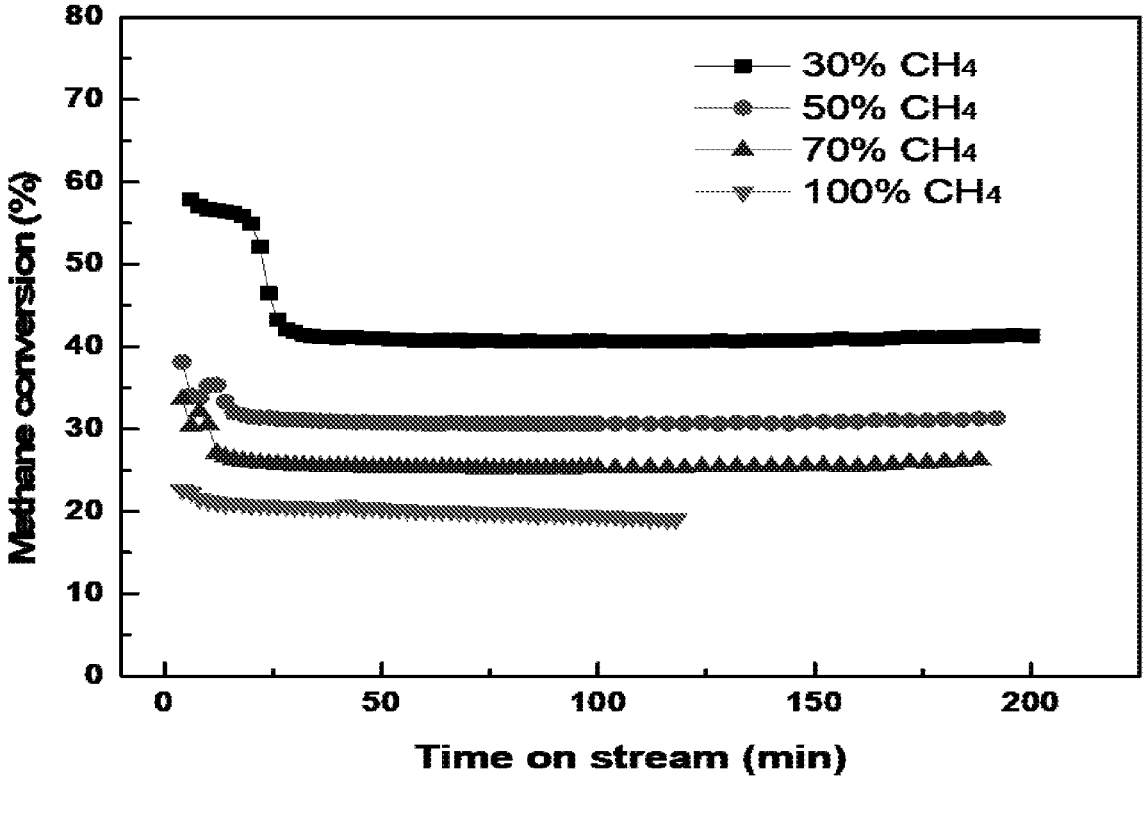
FIG. 28 shows representative data for the conversion of 10Ni-1Pd/CNT at 550° C., 30%-100% CH$_4$/N$_2$ (30 sccm).

Data in FIG. 28 show conversion of 10Ni-1Pd/CNT at 550° C., 30%-100% $CH_4/N_2$ (30 sccm). The increased partial pressures of $CH_4$ (feedstock concentration increase equals partial pressure increase) leads to the decreased conversion for the 10Ni-1Pd/CNT. However, it should be noted that these do not mean that there is downgraded performance of 10Ni-1Pd/CNT. In fact, the data show that the catalyst is maintains stable performance even at 100% $CH_4$, while conventional catalysts would be deactivated by coking at this high $CH_4$ concentration. Moreover, the amount of reacted $CH_4$ is actually increased with the increase in $CH_4$ concentration. For example, in terms of methane reacted, 30% $CH_4$ with 41% conversion equals to 100% $CH_4$ at 13% conversion. However, at 100% $CH_4$ concentration, a stable 20% conversion is obtained for the 10Ni-1Pd/CNT, suggesting the amount of reacted $CH_4$ is actually increased by 67%.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method for producing hydrogen from methane, the method comprising:
  using a catalyst comprising (i) nickel and (ii) a second metal selected from copper or palladium to decompose methane into a product carbon and hydrogen at a reaction temperature ranging from 500° C. to 600° C. for a reaction time period, wherein the nickel and the second metal are present in amounts that provide a weight ratio of nickel to the second metal of 5:1 to 10:1 (nickel:second metal);
  combining the product carbon and the catalyst with nitric acid having a concentration of at least 2M to form a mixture;
  stirring the mixture at a temperature of at least 120° C., wherein the nitric acid causes metal ions or atoms from the catalyst to separate from the product carbon such that at least 86% of the total amount of metal ions or atoms are removed from the product carbon;
  removing the metal ions or atoms from the mixture;
  removing the product carbon from the mixture; and
  using from about 50 wt % to about 95 wt % of the product carbon to restart the method.

2. The method of claim 1, further comprising:
  (i) admixing one or more catalyst precursor compounds in a solvent to produce a metal-precursor solution;
  (ii) removing the solvent from the catalyst precursor compounds to form the catalyst;
  (iii) collecting the hydrogen; or
  (iv) any combination of two or more of (i), (ii), or (iii).

3. The method of claim 2, wherein the metal-precursor solution further comprises a seed carbon support; and wherein nitric acid is used to cause the catalyst precursor compounds to separate from the seed carbon support.

4. The method of claim 3, wherein the method further comprises removing the seed carbon support from the metal-precursor solution.

5. The method of claim 3, wherein the seed carbon support is used in the method after being treated with nitric acid.

6. The method of claim 3, wherein the seed carbon support is used in the method without pretreatment.

7. The method of claim 3, wherein the metal-precursor solution is heated at a synthesis temperature for a synthesis time period to produce the catalyst, wherein the catalyst is supported on the seed carbon support.

8. The method of claim 3, wherein the seed carbon support comprises nanoparticles, fullerenes, carbon filaments, single-walled carbon nanotubes, multi-walled carbon nanotubes, carbon nanofibers, or a combination thereof.

9. The method of claim 1, wherein the product carbon comprises nanoparticles, fullerenes, carbon filaments, single-walled carbon nanotubes, multi-walled carbon nanotubes, carbon nanofibers, or a combination thereof.

10. The method of claim 1, wherein the catalyst is obtained from a catalyst precursor compound, which comprises a nickel salt, a palladium salt a copper salt, or a combination thereof.

11. The method of claim 10, wherein the copper salt comprises $CuSO_4$, $CuCl_2$, $Cu(NO_3)_2$, $Cu(NO_3)_2 \cdot 3H_2O$, CuO, $Cu(CH_3COO)_2$, $Cu_3(PO_4)_2$, $Cu(ClO_4)_2$, $CuO_2$, $Cu(hfac)_2$, $CuO_3Si$, $Cu(CO_2CH_3)$, $Cu(NH_3)_4$, $Cu(SCN)_2$, $Cu(NH_3)_4SO_4 \cdot H_2O$, $Cu(OH)_2$, $CuBr_2$, or a combination thereof.

12. The method of claim 10, wherein the nickel salt comprises $Ni(NO_3)_2 \cdot 6H_2O$, $NiCl_2$, $NiCl_2 \cdot 6H_2O$, $NiBr_2$, $NiF_2$, $NiBr_2 \cdot xH_2O$, $NiBr_2 \cdot 3H_2O$, or a combination thereof.

13. The method of claim 10, wherein the palladium salt comprises $Pd(NO_3)_2 \cdot 2H_2O$, $PdCl_2$, $4PdSO_4$, $PdI_2$, $(CF_3CO_2)_2Pd$, $C_{10}H_{18}O_4Pd$, $Pd(NO_3)_2$, $Pd(NO_3)_2 \cdot 4NH_3$, $Pd(C_2H_3O_2)_2 \cdot 4NH_3 \cdot 2H_2O$, $Pd(CHO_3)_2 \cdot 4NH_3$, $Pd(NH_3)_4Cl_2 \cdot H_2O$, $(C_2H_5CO_2)_2Pd$, or a combination thereof.

14. The method of claim 10, wherein the catalyst precursor compound comprises $Ni(NO_3)_2 \cdot 6H_2O$ and $Pd(NO_3)_2 \cdot 2H_2O$.

15. The method of claim 10, wherein the catalyst precursor compound comprises $Ni(NO_3)_2 \cdot 6H_2O$ and $Cu(NO_3)_2 \cdot 6H_2O$.

16. The method of claim 1, wherein the catalyst is bimetallic.

17. The method of claim 16, wherein the catalyst comprises nickel and palladium, wherein the nickel and palladium are present in amounts that provide a weight ratio of nickel to palladium of 10:1; or wherein the catalyst comprises nickel and copper, wherein the copper and nickel are present in amounts that provide a weight ratio of nickel to copper of 10:1.

18. The method of claim 1, wherein the method has a first pass conversion; and wherein the first pass conversion results in at least 5% of the methane being converted.

* * * * *